(12) United States Patent
Kokuryo et al.

(10) Patent No.: US 9,255,381 B2
(45) Date of Patent: Feb. 9, 2016

(54) CONSTRUCTION MACHINE

(71) Applicant: HITACHI CONSTRUCTION MACHINERY CO., LTD., Tokyo (JP)

(72) Inventors: Osamu Kokuryo, Koka (JP); Junya Kawamoto, Moriyama (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/353,613

(22) PCT Filed: Nov. 30, 2012

(86) PCT No.: PCT/JP2012/081133
§ 371 (c)(1),
(2) Date: Apr. 23, 2014

(87) PCT Pub. No.: WO2013/099519
PCT Pub. Date: Jul. 4, 2013

(65) Prior Publication Data
US 2014/0301816 A1 Oct. 9, 2014

(30) Foreign Application Priority Data
Dec. 26, 2011 (JP) ................................. 2011-283110

(51) Int. Cl.
B60K 11/04 (2006.01)
E02F 9/08 (2006.01)
B60K 11/08 (2006.01)
E02F 3/32 (2006.01)

(52) U.S. Cl.
CPC .............. E02F 9/0866 (2013.01); B60K 11/04 (2013.01); B60K 11/085 (2013.01); E02F 3/325 (2013.01); E02F 9/0808 (2013.01); B60Y 2200/412 (2013.01)

(58) Field of Classification Search
CPC ...... E02F 9/0866; E02F 9/0808; B60K 11/04; B60K 11/085; B60K 11/08; B60Y 2200/412; F01P 2003/182; F01P 2003/185; F01P 11/10
USPC ........................................................ 180/68.1
See application file for complete search history.

(56) References Cited

U.S. PATENT DOCUMENTS 6,622,668 B2 * 9/2003 Izumi ......................... 123/41.49
6,901,903 B2 * 6/2005 Nakajima et al. .......... 123/198 E
(Continued)

FOREIGN PATENT DOCUMENTS

JP 10-280959 A 10/1998
JP 2007-076602 A 3/2007
(Continued)

Primary Examiner — John Walters
Assistant Examiner — Brian Swenson
(74) Attorney, Agent, or Firm — Mattingly & Malur, PC

(57) ABSTRACT

A cooling fan (12) generating a cooling air in a suctioning direction, a radiator (20) provided by facing the cooling fan (12) and cooling an engine coolant by passage of the cooling air, and an oil cooler (21) arranged in parallel with the radiator (20) so as to be in parallel with respect to a flow direction of the cooling air and cooling a hydraulic oil by passage of the cooling air are provided. On a suction side of the cooling air with respect to the radiator (20) and the oil cooler (21), a cooling-air adjusting member (26) for adjusting a ratio of a cooling air amount to be supplied to the radiator (20) and a cooling air amount to be supplied to the oil cooler (21) is provided.

6 Claims, 17 Drawing Sheets

(56) References Cited

U.S. PATENT DOCUMENTS

| | | | |
|---|---|---|---|
| 7,134,518 B2 * | 11/2006 | Arai et al. | 180/68.1 |
| 7,603,968 B2 * | 10/2009 | Pantow | 123/41.04 |
| 8,162,087 B2 * | 4/2012 | Kobayashi et al. | 180/68.6 |
| 8,317,889 B2 * | 11/2012 | Kobayashi et al. | 55/385.3 |
| 8,505,499 B2 * | 8/2013 | Hirasawa et al. | 123/41.31 |
| 2007/0187075 A1 * | 8/2007 | Yamada et al. | 165/135 |
| 2012/0227943 A1 * | 9/2012 | Nakashima | 165/121 |

FOREIGN PATENT DOCUMENTS

| | | |
|---|---|---|
| JP | 2011-140839 A | 7/2011 |
| WO | 2009/101935 A1 | 8/2009 |

\* cited by examiner

CONSTRUCTION MACHINE

TECHNICAL FIELD

The present invention relates to a construction machine such as a hydraulic excavator and the like provided with a cooler including a radiator for cooling an engine coolant, an oil cooler for cooling a hydraulic oil and the like, for example.

BACKGROUND ART

In general, a hydraulic excavator as a typical example of a construction machine is composed of an automotive lower traveling structure, an upper revolving structure rotatably mounted on the lower traveling structure, and a working mechanism tiltably provided on a front side of the upper revolving structure.

Here, the hydraulic excavator includes a small-sized hydraulic excavator for performing a work in a narrow work site or the like where obstructions are present on the periphery. This small-sized hydraulic excavator is called a small revolving-type excavator or a rear small revolving-type excavator, for example. These small-sized hydraulic excavators are configured such that a counterweight is formed having an arc shape and is arranged at a position close to a revolving center so that, when the upper revolving structure operates to revolve, its rear side is substantially accommodated in a vehicle width of the lower traveling structure.

The upper revolving structure of the small-sized hydraulic excavator is composed of a revolving frame forming a support structural body, an engine mounted on a rear side of the revolving frame and driving a hydraulic pump, a cooling fan generating a cooling air in a sucking direction by being rotated/driven by the engine, a radiator provided by being faced with the cooling fan and cooling the engine coolant by passage of the cooling air generated by the cooling fan, and an oil cooler for cooling the hydraulic oil by the cooling air. The radiator and the oil cooler are arranged in parallel with respect to a flow direction of the cooling air so that the both can receive the cold cooling air (see, Patent Document 1, for example).

PRIOR ART DOCUMENT

Patent Document

Patent Document 1: International Publication No. WO2009/101935 A1

SUMMARY OF THE INVENTION

The hydraulic excavator of Patent Document 1 is formed having a compact size so that, when the upper revolving structure is revolved/operated, it is accommodated in the vehicle width of the lower traveling structure and thus, an installation space on the revolving frame is small. In this case, a space around an operator's seat where an operator performs operation, an engine, a hydraulic pump, a fuel tank, a hydraulic oil tank and the like need sizes according to specification of the hydraulic excavator, and the space for installing them cannot be made small. Therefore, the radiator and the oil cooler are installed in a small space.

The radiator is to cool the engine coolant and needs the size (cooling capacity) according to an emission, an output and the like of the engine. Thus, if a large radiator is needed, the size of the oil cooler is reduced by a portion by which the radiator is formed larger. As a result, the cooling capacity of the oil cooler lowers, and a temperature of the hydraulic oil rises, which leads to a problem that a replacement cycle of the hydraulic oil is reduced.

In view of the above described problem with the conventional art, it is an object of the present invention to provide a construction machine in which, even if either one of the coolers arranged in parallel is small, the cooling capacity can be improved by supplying the cooling air in an amount required for cooling to this small-sized cooler.

(1) A construction machine according to the present invention comprises: an automotive vehicle body; an engine mounted on the vehicle body and driving a hydraulic pump; a cooling fan for generating a cooling air in a suctioning direction by being rotated/driven with the engine as a driving source; a first cooler provided on an upstream side of a flow direction of the cooling air, faced with the cooling fan, and cooling a fluid to be cooled by passage of the cooling air; and a second cooler arranged in parallel with the first cooler so as to be in parallel with the first cooler with respect to the flow direction of the cooling air and cooling another fluid by the cooling air.

In order to solve the above-mentioned problem, a characteristic of a configuration employed by the present invention is that on a suction side of the cooling air passing through the first cooler and the second cooler, a cooling-air adjusting members for adjusting a ratio of a cooling air amount to be supplied to the first cooler to a cooling air amount to be supplied to the second cooler is provided.

With this arrangement, since the size of the vehicle body is made small, even if either one of the first cooler and the second cooler cannot be formed large, the cooling-air adjusting member can lead the cooling air in a required air amount to the small-sized cooler in the cooling air sucked by the cooling fan from an outside.

As a result, since a required amount of the cooling air can be led toward the small-sized cooler in the two coolers arranged in parallel, even the small-sized cooler can reliably cool a fluid to be cooled by having an appropriate amount of the cooling air flow, whereby cooling capacity can be improved.

(2) The cooling-air adjusting member is arranged at a boundary position between the first cooler and the second cooler by extending in a vertical direction; and the cooling-air adjusting member is arranged with inclination so as to guide the cooling air to a required direction.

With this arrangement, only by inclining the cooling-air adjusting member provided at the boundary position between the first cooler and the second cooler to the first cooler side, an air amount of the cooling air supplied toward the second cooler can be increased. As a result, even if an area of an inlet opening of the second cooler is small, a fluid can be reliably cooled by increasing an air amount of the cooling air.

(3) According to the present invention, the cooling-air adjusting member is formed as an air flow guide plate formed of a plate body extending in the vertical direction in order to lead the cooling air flowing toward each of the coolers; and the air flow guide plate is provided capable of changing an angle to the cooling air and/or an area faced with the cooling air.

With this arrangement, if the angle of the air flow guide plate is changed, for example, the air flow guide plate is largely inclined toward the first cooler, an amount of the cooling air toward the first cooler can be reduced, while an amount of the cooling air toward the second cooler can be increased. If the air flow guide plate is slightly inclined toward the first cooler, a small amount of the cooling air can be led to the second cooler.

On the other hand, if the area of the air flow guide plate is changed, for example, the area of the air flow guide plate receiving the cooling air is increased, much of the cooling air toward the first cooler can be led to the second cooler. If the area of the air flow guide plate is made small, a small amount of the cooling air can be led to the second cooler. As a result, a ratio of the cooling air to be supplied to each of the coolers can be easily adjusted. Moreover, the cooling-air adjusting member can be easily formed of a plate body extending in the vertical direction.

(4) According to the present invention, the first cooler is a radiator for cooling an engine coolant for cooling the engine, and the second cooler is an oil cooler for cooling a hydraulic oil to be supplied to various actuators; and the cooling-air adjusting member is arranged at a boundary position between the radiator and the oil cooler so as to ensure a required air amount for cooling each of the radiator and oil cooler.

With this arrangement, by adjusting the ratio of the cooling air to be supplied to the radiator to the oil cooler by the cooling-air adjusting member, required amounts of the cooling air can be ensured, and the engine coolant and the hydraulic oil can be effectively cooled.

(5) According to the present invention, a length dimension in a direction orthogonal to a flow direction of the cooling air of the radiator is formed larger than a length dimension in a direction orthogonal to the flow direction of the cooling air of the oil cooler; and the cooling-air adjusting member is arranged with inclination to the radiator side so as to ensure the cooling air required for cooling toward the oil cooler having a small length dimension. As a result, in the cooling air supplied to the radiator and the oil cooler, a proper amount of the cooling air required for cooling the hydraulic oil can be supplied to the small-sized oil cooler.

(6) According to the present invention, the vehicle body includes an automotive lower traveling structure and an upper revolving structure rotatably provided on the lower traveling structure and having a working mechanism mounted on a front side; the upper revolving structure has a revolving frame forming a support structural body, an arc-shaped counterweight provided on a rear side of the revolving frame in order to take a weight balance with the working mechanism, the engine located on a front side of the counterweight and mounted on the revolving frame in a laterally placed state extending in a left-right direction, and an oil tank located on a front side of the engine and provided on the revolving frame and storing a hydraulic oil and a fuel, respectively; and the first cooler and second cooler are arranged in parallel in a front-rear direction at a position in a space formed by the counterweight, the engine, and the oil tank.

With this arrangement, even if the counterweight is formed having an arc shape and an installation space for the cooler cannot be ensured wide as in a revolving type construction machine, for example, the first and second coolers can be arranged in parallel in the front-rear direction in a space formed by the counterweight, the engine, and the oil tank. In this case, the size of either one of the two coolers might be reduced due to the installation space, but a required amount of the cooling air can be ensured by the cooling-air adjusting member even for the smaller cooler.

MODE FOR CARRYING OUT THE INVENTION

Hereinafter, a rear small revolving-type hydraulic excavator having a radiator and an oil cooler as a typical example of a construction machine according to an embodiment of the present invention will be described in detail by referring to the attached drawings.

FIGS. 1 to 11 show a first embodiment of the present invention. In this first embodiment, a hydraulic excavator with a canopy specification having a canopy covering an upper side of an operator's seat is exemplified. In the hydraulic excavator with the canopy specification, a radiator and an oil cooler are provided as coolers in a heat exchanger.

Figure 1:
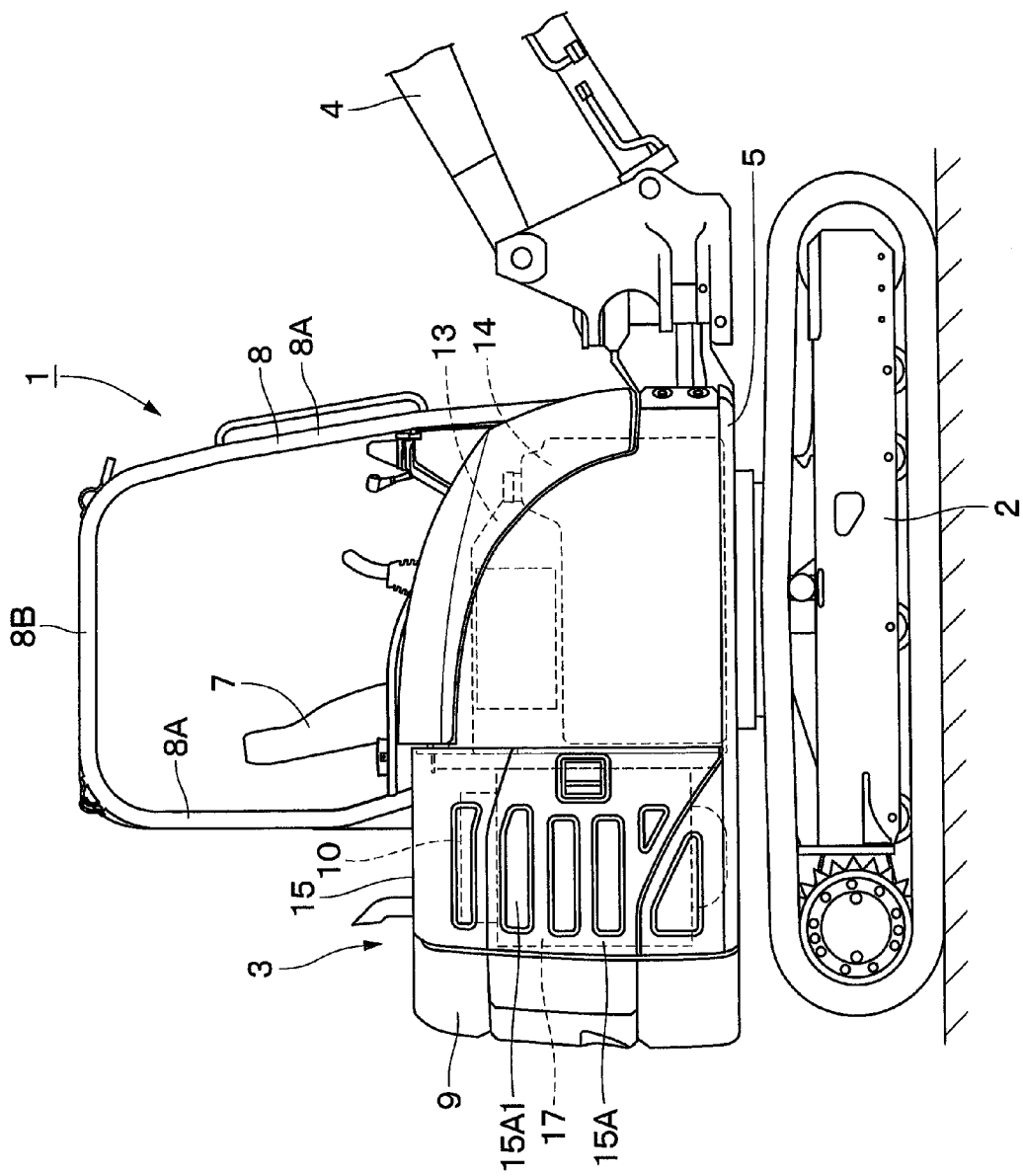
FIG. 1 is a front view showing a hydraulic excavator with a canopy specification according to a first embodiment of the present invention in a state in which a working mechanism is omitted.

In FIG. 1, designated at 1 is a crawler type hydraulic excavator as a construction machine according to the first embodiment. This hydraulic excavator 1 is composed of an automotive lower traveling structure 2, an upper revolving structure 3 rotatably mounted on the lower traveling structure 2, and a working mechanism 4 tiltably provided on a front side in a front-rear direction of the upper revolving structure 3 and performing an excavating work of earth and sand and the like. The lower traveling structure 2 and the upper revolving structure 3 constitute a vehicle body of the hydraulic excavator 1.

Figure 2:
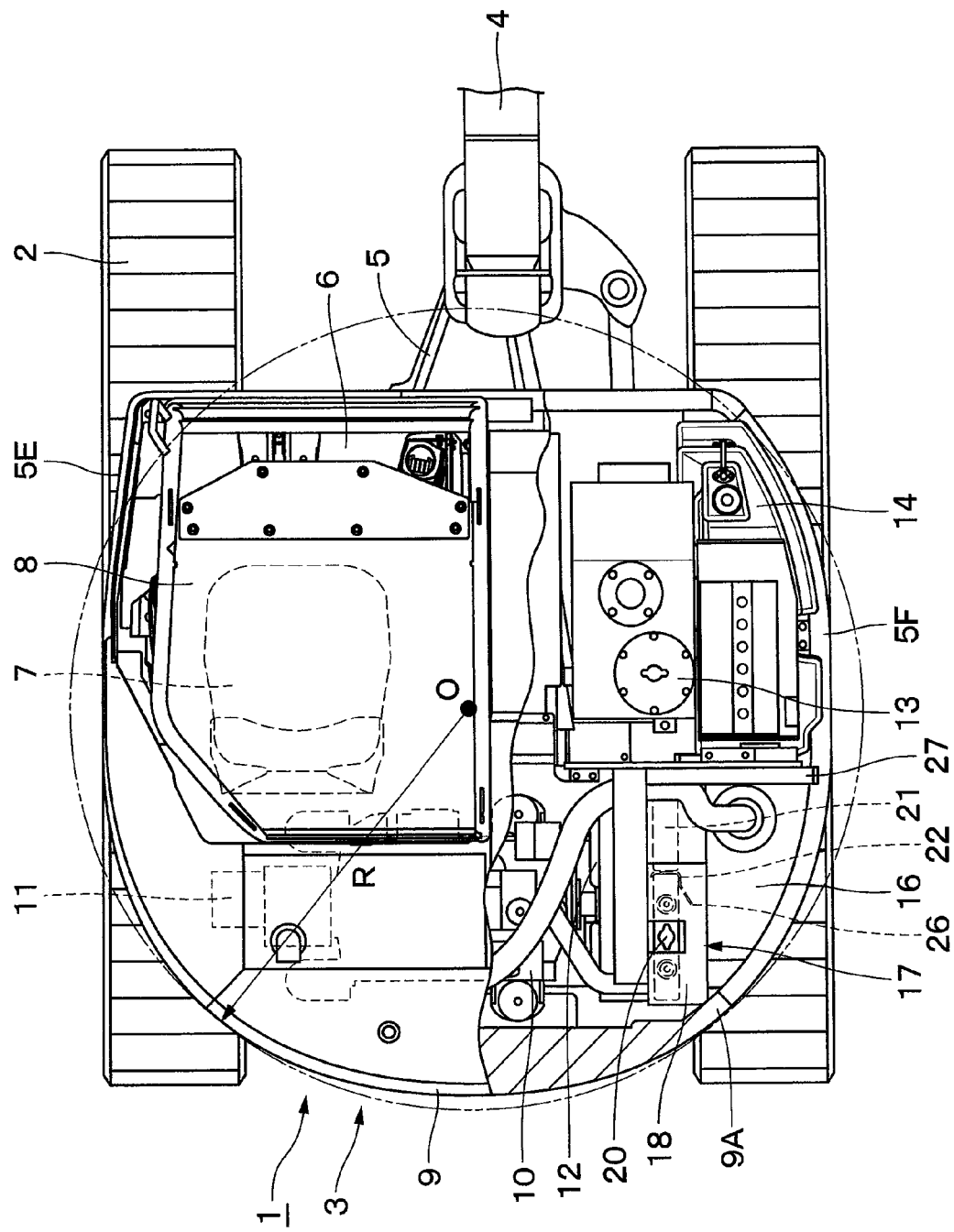
FIG. 2 is a partially broken plan view showing a state in which a floor member, a canopy, an engine, a counterweight, a hydraulic oil tank, a fuel tank, a heat exchanger and the like are mounted on a revolving frame.

Here, as shown in FIG. 2, the upper revolving structure 3 has a width dimension in a left-right direction substantially equal to a vehicle width of the lower traveling structure 2 and is formed having a substantially circular shape when seen from the above so as not to largely protrude from the vehicle width of the lower traveling structure 2 when it performs a revolving operation. That is, the hydraulic excavator 1 is constituted as a rear small revolving-type hydraulic excavator in which a revolving radius R of a counter weight 9 which will be described later is substantially accommodated in the vehicle width of the lower traveling structure 2, assuming that the upper revolving structure 3 revolves on the lower traveling structure 2 with a revolving center as O and the revolving radius as R. The upper revolving structure 3 is composed of a revolving frame 5, a floor member 6, an operator's seat 7, a canopy 8, a counterweight 9, an engine 10, a hydraulic oil tank 13, a fuel tank 14, a heat exchanger 17 and the like, which will be described later.

Figure 3:
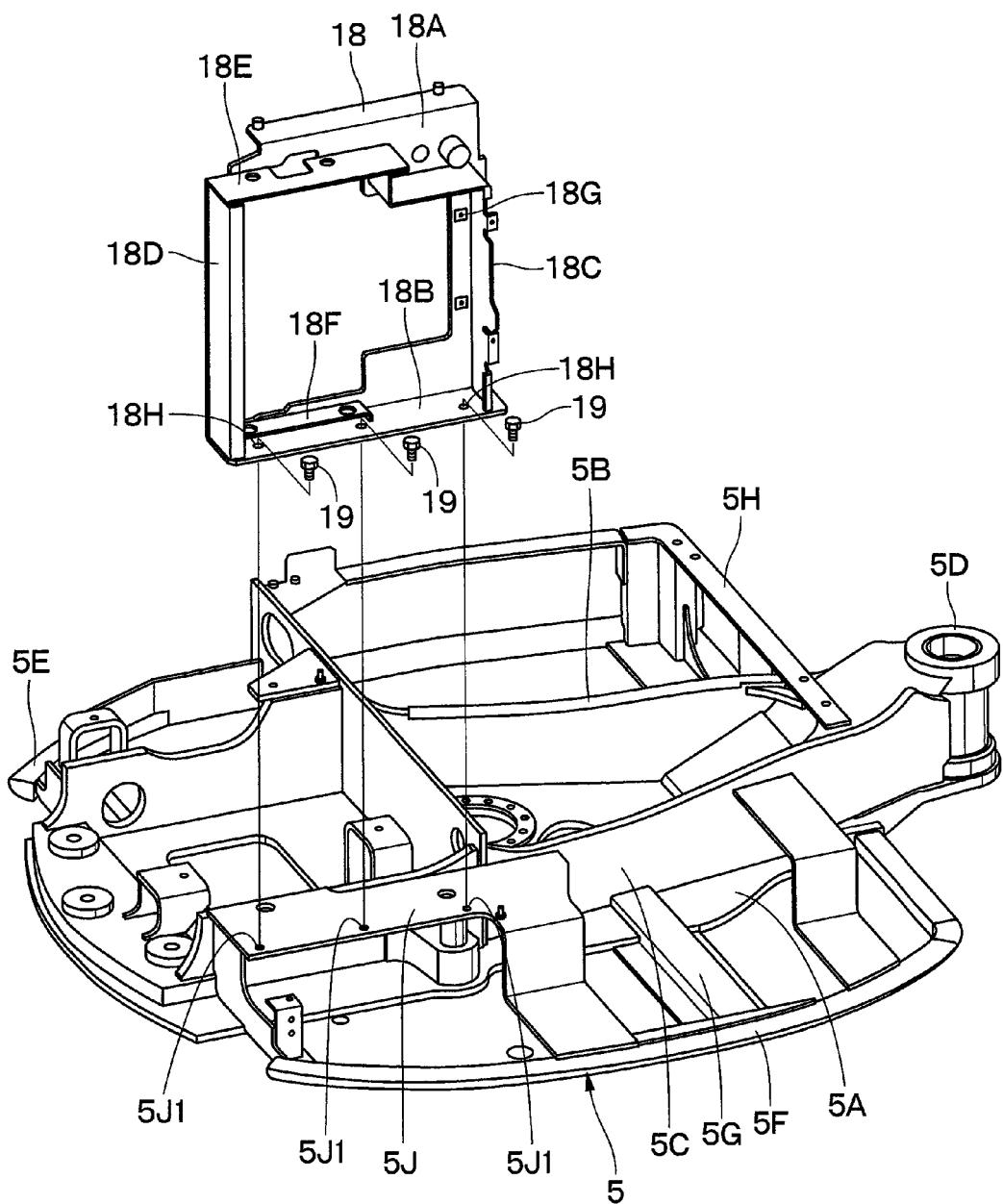
FIG. 3 is an exploded perspective view showing a mounting structure of a support frame of the heat exchanger to the revolving frame.

The revolving frame 5 constitutes a support structural body of the upper revolving structure 3. As shown in FIG. 3, this revolving frame 5 is composed of a flat plate-shaped bottom plate 5A extending in a front-rear direction through an intermediate portion in the left-right direction, a left vertical plate 5B and a right vertical plate 5C installed upright having a substantially V-shape and separated from each other in the left-right direction on an upper surface side of the bottom plate 5A, a support bracket 5D provided on a front end portion of each of the vertical plates 5B and 5C and supporting the working mechanism 4, a left side frame 5E and a right side frame 5F located outside in the left-right direction and extending in the a front-rear direction, extension beams 5G extending in the left-right direction from the bottom plate 5A and each of the vertical plates 5B and 5C and connected to each of the side frames 5E and 5F respectively, and a housing mounting frame 5H provided by being located on a front left side of the left vertical plate 5B.

A mounting base 5J is provided on a rear side of the revolving frame 5, extending to the right side from an upper part of the right vertical plate 5C. This mounting base 5J is on which a support frame 18 of the heat exchanger 17 which will be described later is mounted and has three screw holes 5J1, for example, at intervals in the front-rear direction for fixing the support frame 18.

The floor member 6 is provided on the housing mounting frame 5H on a front left side of the revolving frame 5 (see, FIGS. 2 and 3). This floor member 6 is on which an operator who operates the hydraulic excavator 1 gets, and the operator's seat 7 on which the operator is seated is provided. The canopy 8 is provided on the floor member 6 so as to cover the upper side of the operator's seat 7, and the canopy 8 is constituted as a four-column type canopy composed of four leg part 8A and a roof part 8B.

The counterweight 9 is mounted on a rear side of the revolving frame 5. This counterweight 9 is to take a weight balance with the working mechanism 4 and is formed as a heavy article having a substantially arc shape with the revolving radius R from the revolving center O. The counterweight 9 used in the rear small revolving-type hydraulic excavator 1 is formed having an arc shape having a center part in the left-right direction projecting to a rear side, and a right end portion 9A, for example, extends to a front side until it reaches the heat exchanger 17 which will be described later while being curved in an arc shape.

The engine 10 is located on a front side of the counterweight 9 and mounted in a laterally placed state extending in the left-right direction on the revolving frame 5. On a left side in the left-right direction of the engine 10, a hydraulic pump 11 (indicated by a dot line in FIG. 2) which raises a pressure of (pressurizes) the hydraulic oil supplied from the hydraulic oil tank 13 which will be described later and supplies the same is mounted. The hydraulic oil returned by driving the various actuators provided on the working mechanism 4 and the like is returned to the hydraulic oil tank 13 after being cooled by an oil cooler 21 which will be described later.

Designated at 12 is a suction type cooling fan provided on a rotational shaft 10A of the engine 10, and the cooling fan 12 is provided on aside opposite to the hydraulic pump 11 (right side in the left-right direction) sandwiching the engine 10. This cooling fan 12 is rotated/driven by the engine 10 so as to suction an outside air as a cooling air through a suction port 15A1 of a side cover 15A constituting an exterior cover 15 which will be described later and to supply it to the heat exchanger 17.

The hydraulic oil tank 13 is provided on a front side of the engine 10 and also located on a side of the canopy 8 and provided on the revolving frame 5, and the hydraulic oil tank 13 constitutes an oil tank storing the hydraulic oil to be supplied to the hydraulic pump 11. The fuel tank 14 is provided on the revolving frame 5 adjacently on the right side of the hydraulic oil tank 13, and the fuel tank 14 constitutes an oil tank storing a fuel to be supplied to the engine 10. It should be noted that the hydraulic oil tank 13 and the fuel tank 14 may be arranged on opposite sides in the left-right direction. Moreover, the hydraulic oil tank 13 and the fuel tank 14 may be arranged by being juxtaposed in the front-rear direction.

The exterior cover 15 is provided on the revolving frame 5 from a rear side to a side of the canopy 8. This exterior cover 15 is to cover the engine 10, the hydraulic pump 11, the heat exchanger 17 and the like mounted on the revolving frame 5. On the right side of the exterior cover 15, the arc-shaped side cover 15A is provided so as to cover a space between the counterweight 9 and the fuel tank 14 oppositely to the engine 10 (cooling fan 12). On this side cover 15A, the suction port 15A1 (see, FIGS. 1 and 4) for suctioning the outside air as a cooling air when the cooling fan 12 is rotated/driven is provided.

Figure 4:
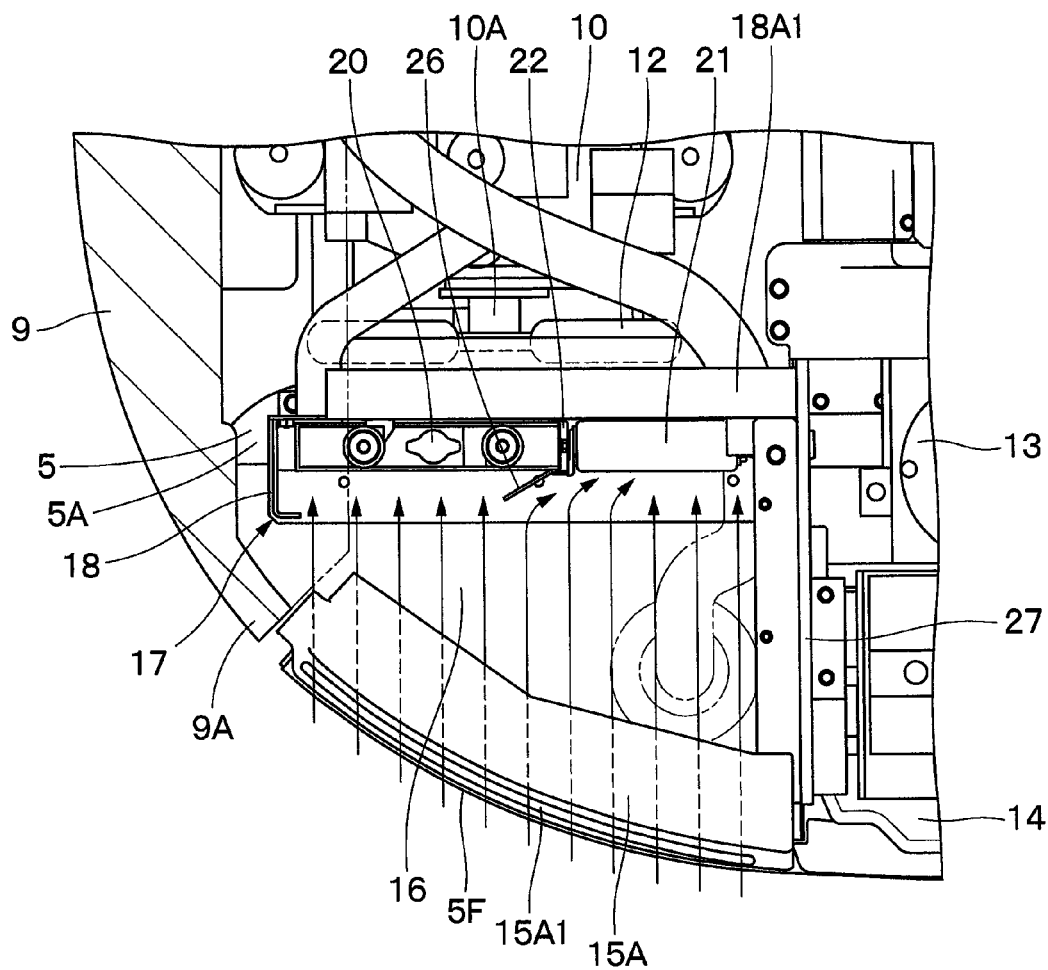
FIG. 4 is a plan view showing a flow state of cooling air to the heat exchanger with an essential part in FIG. 3 in an enlarged manner.

Here, as shown in FIGS. 2 and 4, at a position on a rear right side of the upper revolving structure 3, a space 16 surrounded by the counterweight 9, the engine 10, the hydraulic oil tank 13, the fuel tank 14, and the side cover 15A of the exterior cover 15 is formed. This space 16 is provided by using a space on a rear right side of the rear small revolving-type hydraulic excavator 1. The space 16 is formed as a triangular installation space since the right end portion 9A of the counterweight 9 and the side cover 15A are inclined. In this space 16, the heat exchanger 17 which will be described is arranged.

Next, the heat exchanger 17 according to the first embodiment for cooling the engine coolant for cooling the engine 10 and the hydraulic oil for operating the various actuators will be described by referring to FIGS. 2 to 11.

In FIG. 2, designated at 17 is the heat exchanger provided in the space 16 on the rear side of the revolving frame 5 so as to face a front surface side of the cooling fan 12 of the engine 10. This heat exchanger 17 is to cool the engine coolant and the hydraulic oil whose temperatures are raised by a cooling air. The heat exchanger 17 is composed of the support frame 18, a radiator 20, the oil cooler 21, a connecting bracket 22, an air flow guide plate 26 and the like, which will be described later.

Indicated at 18 is the support frame forming an outer frame of the heat exchanger 17. This support frame 18 is arranged such that a direction orthogonal to a flow direction of the cooling air by the cooling fan 12, that is, the front-rear direction of the upper revolving structure 3 in the engine 10 mounted in the laterally placed state extending in the left-right direction as in the first embodiment is a length direction. This support frame 18 is formed as a frame structural body surrounding and supporting the radiator 20 and the oil cooler 21.

Figure 8:
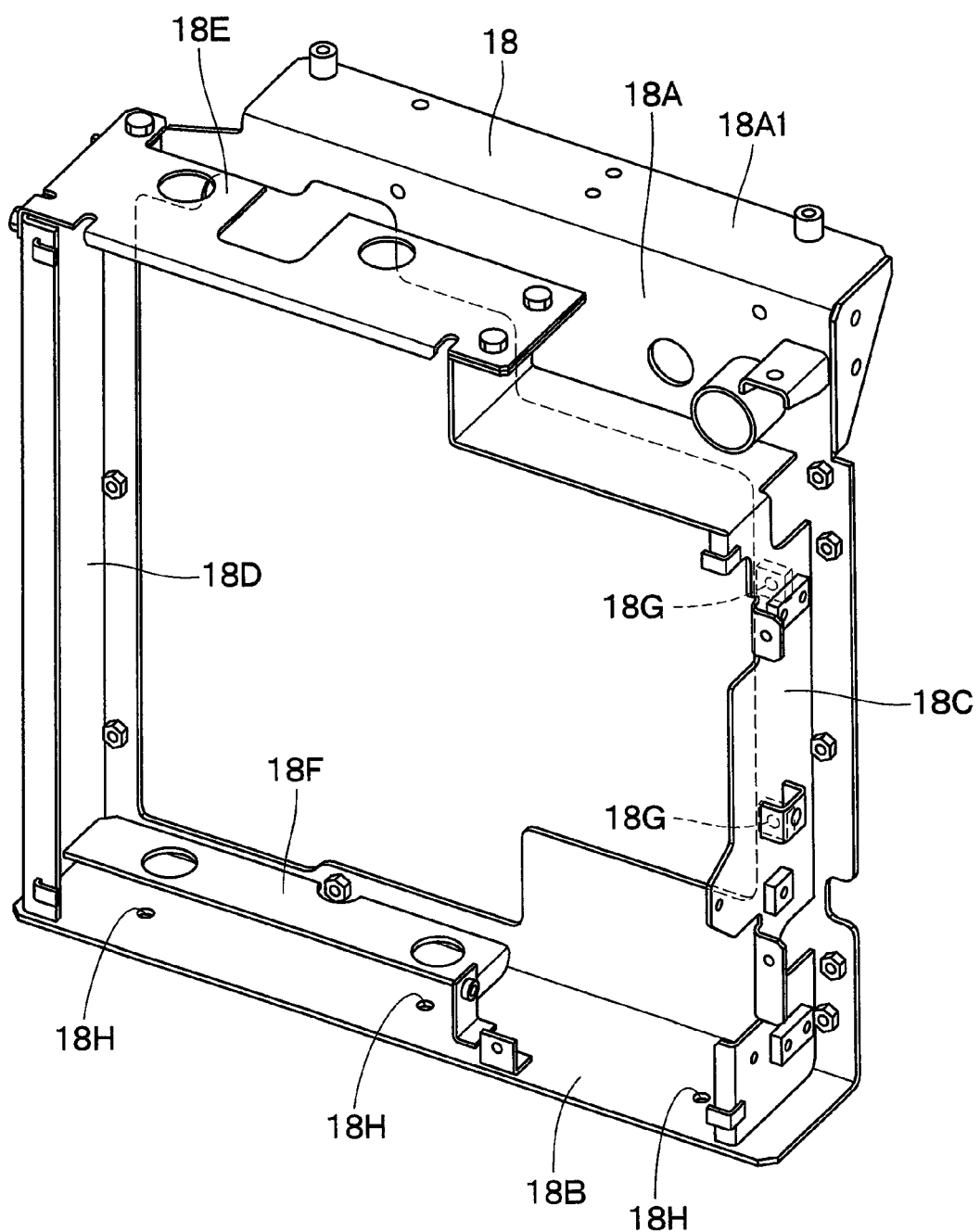
FIG. 8 is an appearance perspective view showing the support frame of the heat exchanger in an enlarged manner.

As shown in FIG. 8, the support frame 18 is composed of a substantially square-shaped frame plate portion 18A, a mounting plate portion 18B formed by bending a lower part of the frame plate portion 18A toward an upstream side in the flow direction of the cooling air, a first side plate portion 18C and a second side plate portion 18D provided by facing both end portions of the frame plate portion 18A in a direction orthogonal to the flow direction of the cooling air, and an upper plate portion 18E mounted on an upper part of each of the side plate portions 18C and 18D. The upper plate portion 18E supports an upper portion of the radiator 20, and a support plate portion 18F supporting a lower portion of the radiator 20 is provided on the lower side of the frame plate portion 18A. It should be noted that an upper surface plate 18A1 of the frame plate portion 18A constitutes a cover mounting plate on which the exterior cover 15 is mounted.

Figure 11:
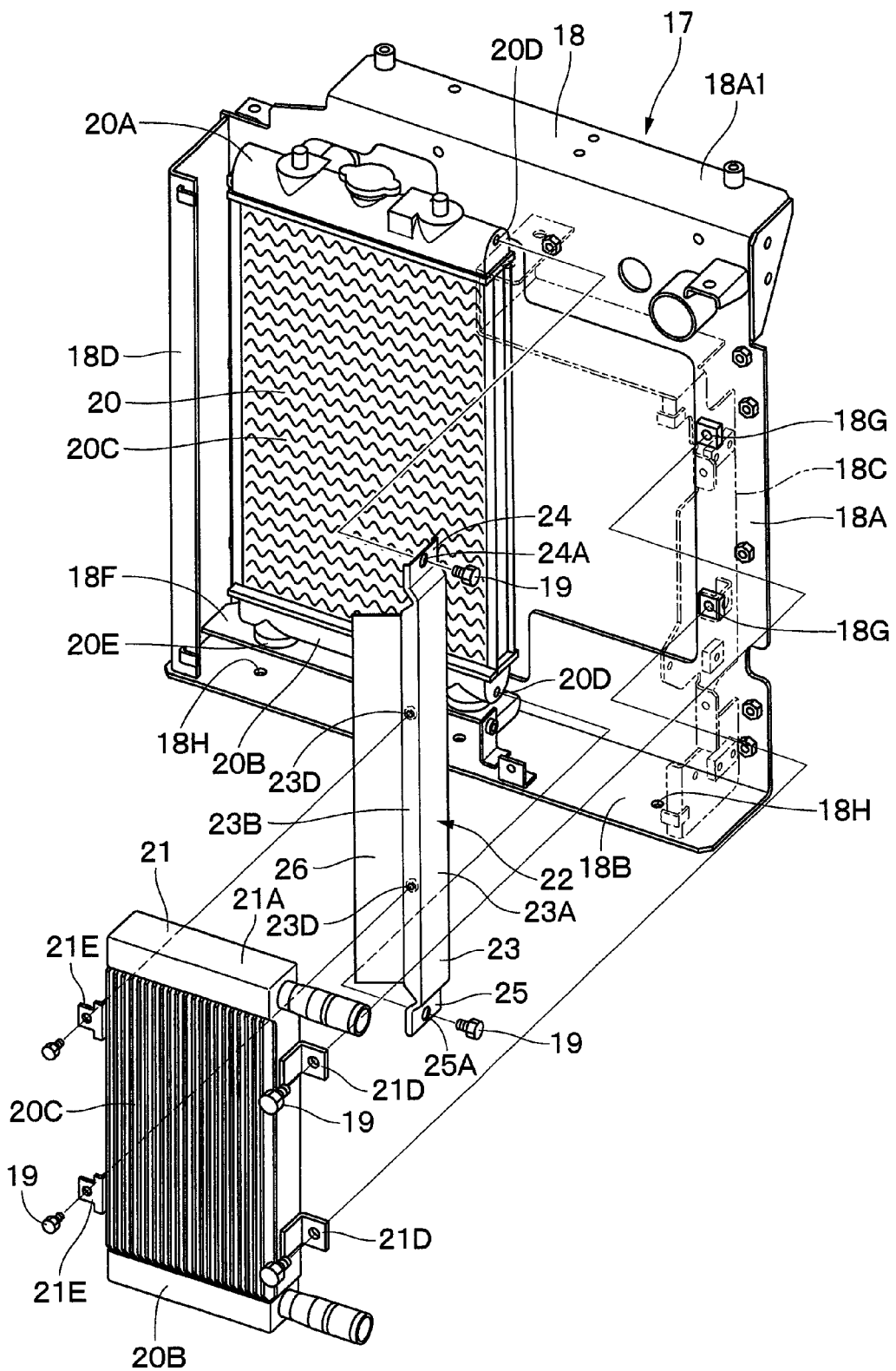
FIG. 11 is an exploded perspective view showing the oil cooler of the heat exchanger and the connecting bracket (air flow guide plate) in an exploded state.

As shown in FIG. 11, on the hydraulic oil tank 13 side of the frame plate portion 18A, a screw hole 18G for mounting the oil cooler 21 which will be described later is disposed at an interval in the vertical direction. Moreover, on the mounting plate portion 18B, three bolt insertion holes 18H are provided correspondingly to three screw holes 5J1 provided on the mounting base 5J of the revolving frame 5.

As shown in FIG. 3, the support frame 18 is mounted on the mounting base 5J of the revolving frame 5 in a state in which the radiator 20, the oil cooler 21 and the like which will be described later are assembled. In this state, by screwing a bolt 19 inserted into the bolt insertion hole 18H into the screw hole 5J1 of the mounting base 5J, the support frame 18 is mounted on the revolving frame 5.

Figure 7:
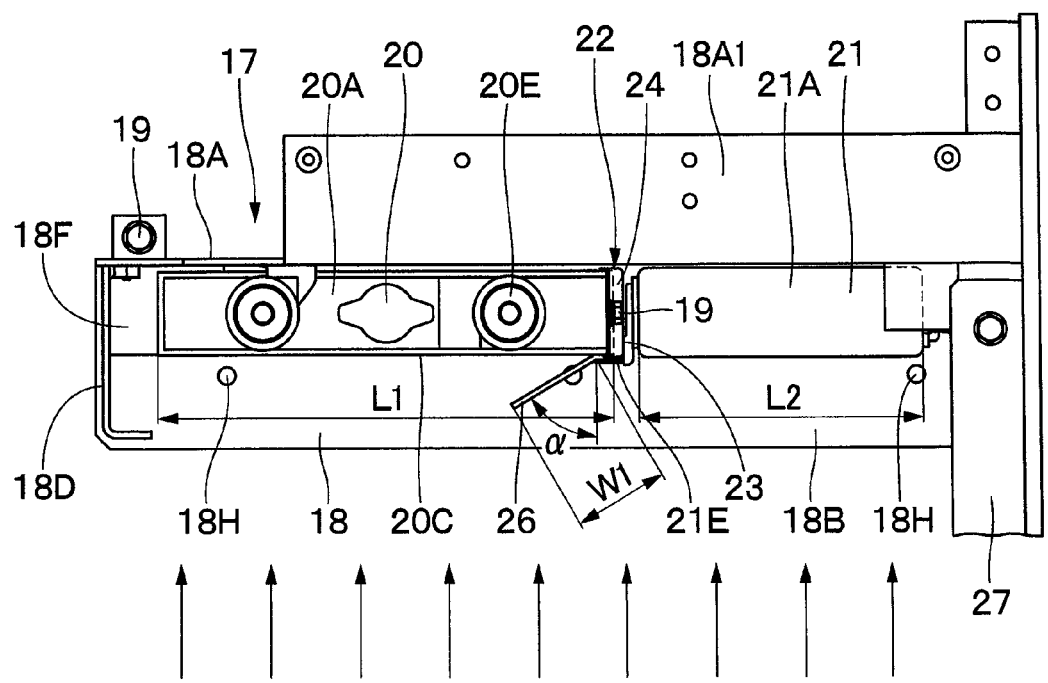
FIG. 7 is a plan view showing the heat exchanger in a state in which a radiator, an oil cooler and an air flow guide plate are seen by omitting an upper part of the support frame.

Indicated at 20 is the radiator as the first cooler provided in the support frame 18. As shown in FIG. 2, the radiator 20 is located on the rear side which is the counterweight 9 side and is arranged in the support frame 18. The radiator 20 is arranged with a direction orthogonal to the flow direction of the cooling air by the cooling fan 12 of the engine 10, that is, the front-rear direction of the revolving frame 5 as the length direction. In this state, as shown in FIG. 7, the radiator 20 is formed having a length dimension L1 in the front-rear direction, and this length dimension L1 is larger than a length dimension L2 of the oil cooler 21 (L1>L2).

The radiator 20 is for cooling the engine coolant whose temperature has risen by cooling the engine 10. As shown in FIG. 11, this radiator 20 is composed of an upper tank 20A, a lower tank 20B, and a heat radiation part 20C, and each of the tanks 20A and 20B is connected to a water jacket (not shown) of the engine 10. On end faces of the upper tank 20A and the lower tank 20B on the oil cooler 21 side, screw holes 20D are provided, respectively. Into these screw holes 20D, the bolt 19 for mounting the connecting bracket 22 which will be described later is screwed.

Figure 5:
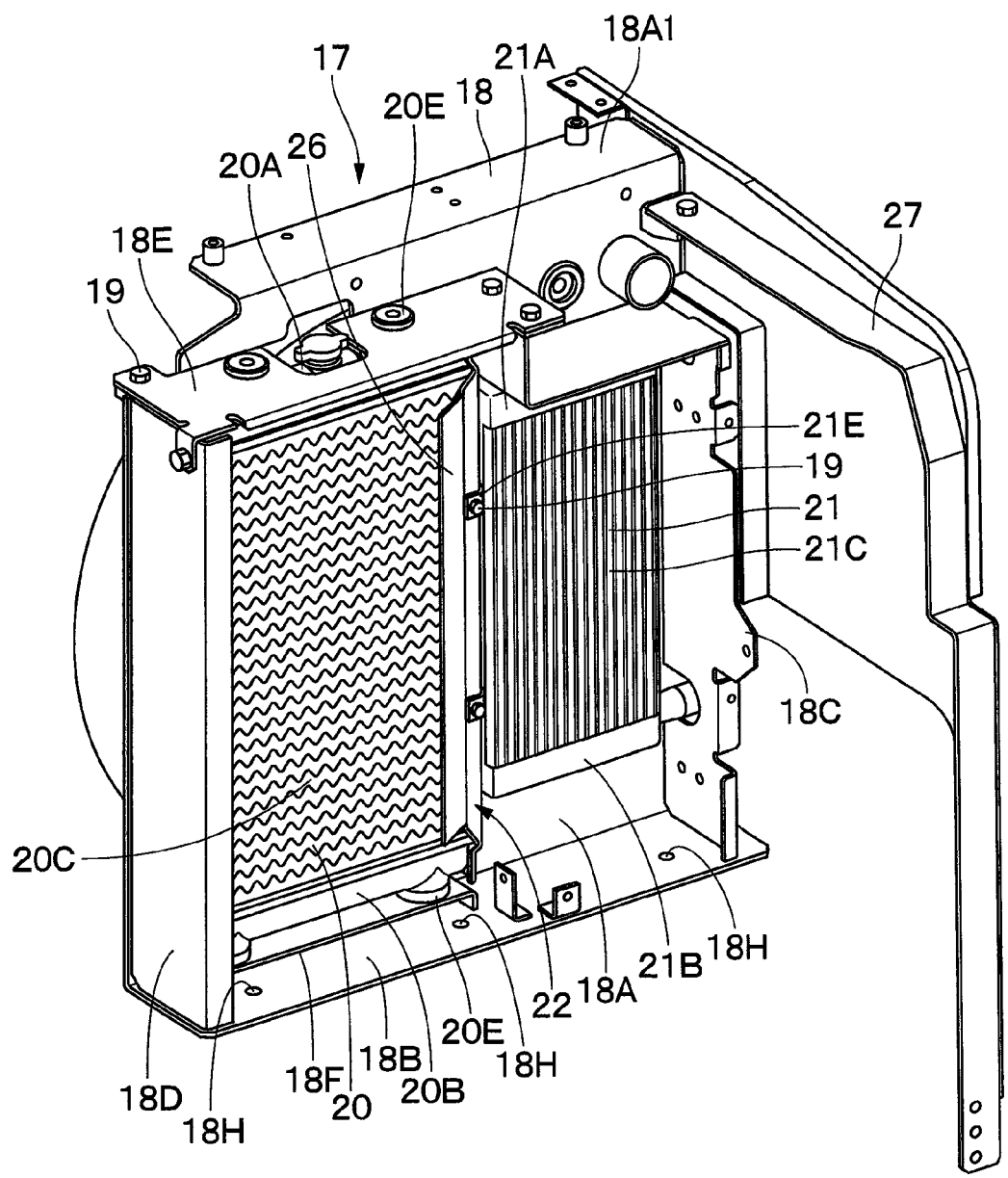
FIG. 5 is an appearance perspective view of a mounting relationship between the heat exchanger and a partition plate shown from a diagonally rear side.
Figure 6:
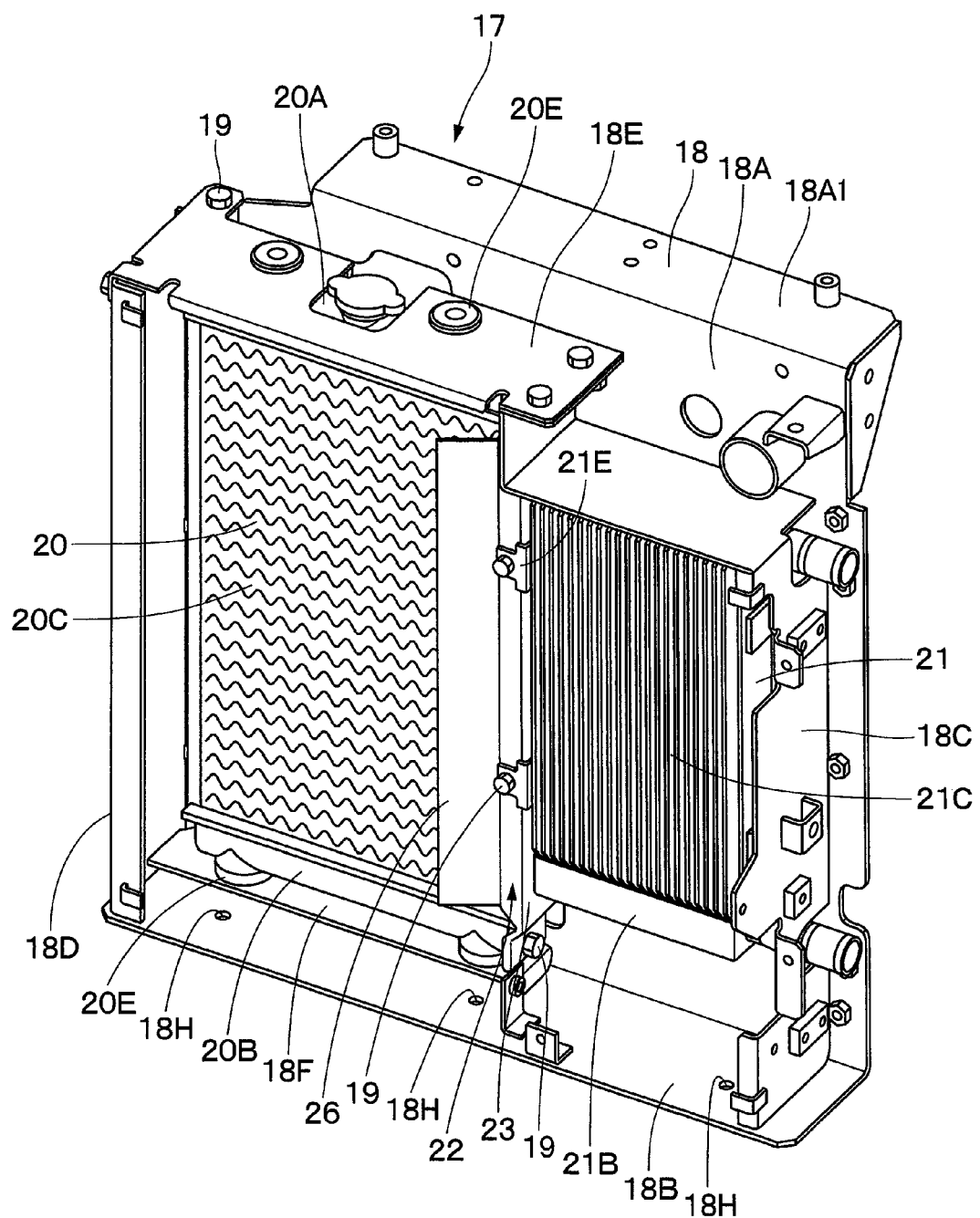
FIG. 6 is an appearance perspective view of the heat exchanger shown from a diagonally front side.

Moreover, as shown in FIGS. 5 and 6, in the radiator 20, the upper tank 20A is supported by the upper plate portion 18E of the support frame 18 through a vibration isolating member 20E, and the lower tank 20B is supported by the support plate portion 18F through the vibration isolating member 20E.

Indicated at 21 is the oil cooler as the second cooler provided on the hydraulic oil tank 13 side in the support frame 18. This oil cooler 21 is arranged in parallel with the radiator 20 so as to be in parallel with respect to the flow direction of the cooling air. As a result, the oil cooler 21 is arranged so as to form a substantially flush plane with the radiator 20. As shown in FIG. 11, the oil cooler 21 is composed of an upper tank 21A, a lower tank 21B, and a heat radiation part 21C substantially similarly to the radiator 20. Here, the oil cooler 21 is arranged with a direction orthogonal to the flow direction of the cooling air by the cooling fan 12, that is, the front-rear direction of the revolving frame 5 as a length direction. In this case, as shown in FIG. 7, the oil cooler 21 is formed having a length dimension L2 in the front-rear direction, and this length dimension L2 is smaller than the length dimension L1 of the radiator 20 (L1>L2). Therefore, the oil cooler 21 is formed as a cooler smaller than the radiator 20.

On the other hand, on an end edge on the first side plate portion 18C side (front side) of the support frame 18, two mounting brackets 21D are provided at an interval in the vertical direction, and on an end edge on the radiator 20 side (rear side), two mounting brackets 21E are provided at an interval in the vertical direction.

The oil cooler 21 can be mounted on the frame plate portion 18A of the support frame 18 by screwing the bolt 19 inserted into the mounting bracket 21D into the screw hole 18G of the support frame 18. On the other hand, the oil cooler 21 can be mounted on the radiator 20 through the connecting bracket 22 by screwing the bolt 19 inserted into the mounting bracket 21E on the radiator 20 side into a screw hole 23D of a bracket body 23 constituting the connecting bracket 22 which will be described later. In this state, the hydraulic oil at a high temperature returned from various actuators flows into the upper tank 21A of the oil cooler 21, and the lower tank 21B makes the cooled hydraulic oil flow out toward the hydraulic oil tank 13.

Designated at 22 is the connecting bracket provided between the radiator 20 and the oil cooler 21. This connecting bracket 22 is to connect the radiator 20 and the oil cooler 21 in a parallel state. On the connecting bracket 22, the air flow guide plate 26 which will be described later is integrally provided at a position on an upstream side (inflow side) when the cooling air flows to the radiator 20 and the oil cooler 21.

Figure 9:
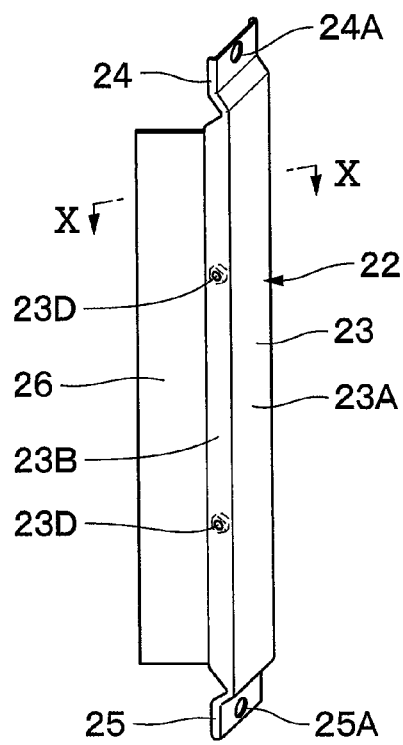
FIG. 9 is an appearance perspective view showing a connecting bracket as a single body on which the air flow guide plate is provided in an enlarged manner.
Figure 10:
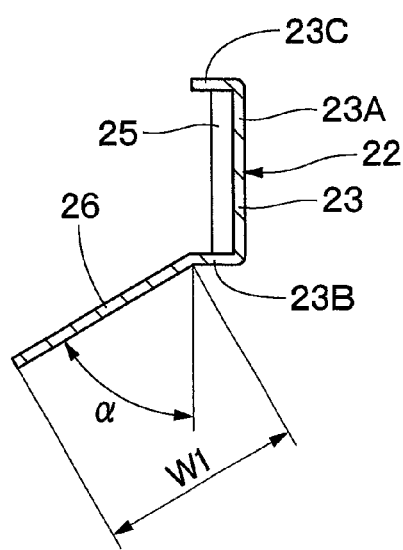
FIG. 10 is an enlarged sectional view of the connecting bracket and the air flow guide plate when seen from an arrow X-X direction in FIG. 9.

As shown in FIGS. 9 and 10, the connecting bracket 22 is composed of the bracket body 23 formed having an L-shaped section by a long plate portion 23A extending in the vertical direction and a pair of bending portions 23B and 23C obtained by bending a long side of the long plate portion 23A, an upper side mounting portion 24 formed by bending an upper side of the bracket body 23 in a crank shape, and a lower side mounting portion 25 formed by bending a lower side of the bracket body 23 in a crank shape. On each of the mounting portions 24 and 25, bolt insertion holes 24A and 25A are provided. On the other hand, on the bending portion 23B of the bracket body 23 located on the inflow side of the cooling air, two screw holes 23D are provided at an interval in the vertical direction.

The connecting bracket 22 screws the bolt 19 inserted into the bolt insertion hole 24A of the upper side mounting portion 24 into the screw hole 20D of the upper tank 20A and screws the bolt 19 inserted into the bolt insertion hole 25A of the lower side mounting portion 25 into the screw hole 20D of the lower tank 20B in a state in which the bracket body 23 is made to follow the end face on the oil cooler 21 side of the radiator 20. As a result, the connecting bracket 22 can be mounted on the radiator 20.

On the other hand, after the connecting bracket 22 is mounted on the radiator 20, each of the mounting brackets 21E of the oil cooler 21 is brought into contact with the bending portion 23B of the bracket body 23, and the bolt 19 inserted into the bracket body 23 is screwed into the screw hole 23D. As a result, the connecting bracket 22 can connect the radiator 20 and the oil cooler 21 in the parallel state with respect to the flow direction of the cooling air, that is, in a series state in the front-rear direction of the revolving frame 5.

Designated at 26 is the air flow guide plate as the cooling-air adjusting member provided on the connecting bracket 22. This air flow guide plate 26 is provided on the upstream side in the flow direction of the cooling air with respect to the radiator 20 and the oil cooler 21, that is, on suction sides of the radiator 20 and the oil cooler 21. This air flow guide plate 26 is to adjust a ratio of the cooling air amount to be supplied to the radiator 20 to the cooling air amount to be supplied to the oil cooler 21. Specifically, the air flow guide plate 26 is to ensure a large amount of the cooling air toward the small-sized oil cooler 21 having the length dimension L2 smaller than the length dimension L1 of the radiator 20. Thus, the air flow guide plate 26 is arranged with inclination toward the radiator 20 side so as to adjust the supply ratio of the cooling air.

Here, the air flow guide plate 26 is formed of a rectangular plate body extending in the vertical direction and is formed integrally with the bending portion 23B of the connecting bracket 22. That is, the air flow guide plate 26 extends in a state bended to the upstream side from the end edge of the bending portion 23B constituting the bracket body 23 of the connecting bracket 22. It should be noted that it may be so configured that the air flow guide plate 26 and the connecting bracket 22 are formed of different members and connected to each other by welding means or screwing means.

Moreover, as shown in FIG. 7, the air flow guide plate 26 has an inclination angle of an angle α on the radiator 20 side and is formed having a width dimension of a dimension W1 from the connecting bracket 22. Here, since the air flow guide plate 26 is formed as an integral article with the connecting bracket 22, the air flow guide plate 26 can be easily provided only by performing a normal work of connecting the radiator 20 and the oil cooler 21 by the connecting bracket 22 without adding the number of assembling processes.

It should be noted that the inclination angle α of the air flow guide plate 26 is defined, assuming that an angle in parallel with the flow direction of the cooling air is 0°, as an angle inclined toward the radiator 20 side from this α=0° position. Therefore, if the inclination angle α=0°, the air amount of the cooling air flowing toward the oil cooler 21 is not increased by the cooling air led from the radiator 20 side, and original amounts of the cooling air according to areas of the respective inlet openings are supplied to the radiator 20 and the oil cooler 21.

Here, the inclination angle α of the air flow guide plate 26 is set to 0° to 70° (α=0° to 70°), for example. The first embodiment exemplifies a case in which the inclination angle α of the air flow guide plate 26 is set to approximately 60°. On the other hand, the width dimension W1 of the air flow guide plate 26 is set to 10 to 30% (W1=L1×0.1 to L1×0.3) of the length dimension L1 of the radiator 20, for example. The first embodiment exemplifies a case in which the width dimension W1 of the air flow guide plate 26 is set to approximately 20% of the length dimension L1 of the radiator 20.

As described above, the air flow guide plate 26 is arranged with inclination to the radiator 20 side so as to cover a part of the oil cooler 21 side of the radiator 20 and is formed by inclining the plate body having the width dimension W1 to the heat radiation part 20C of the radiator 20 by the angle α. As a result, as an arrow shown in FIG. 4, the air flow guide plate 26 can change a direction of a part of the cooling air toward the radiator 20 in the cooling air supplied to the radiator 20 and the oil cooler 21 to the oil cooler 21 side. Therefore, the air flow guide plate 26 can lead the cooling air more than the air amount of the cooling air that can be received by a single body of the oil cooler 21 to the oil cooler 21.

It should be noted that a partition plate 27 is provided on a front side of the heat exchanger 17. This partition plate 27 is to shut off between the heat exchanger 17 on the engine 10 side and the hydraulic oil tank 13 as well as the fuel tank 14 and is provided so as to extend in the left-right direction on the front side of the heat exchanger 17.

The hydraulic excavator 1 according to the first embodiment has the configuration as described above, and subsequently, an operation of this hydraulic excavator 1 will be described.

In order to operate the hydraulic excavator 1, the operator gets onboard the floor member 6 and sits on the operator's seat 7. By operating a lever for traveling in this state, the operator can advance or retreat the hydraulic excavator 1 by driving the lower traveling structure 2. On the other hand, the operator seated on the operator's seat can perform an excavating work of earth and sand and the like by operating the working mechanism 4 and the like through operation of the lever for working.

While the hydraulic excavator 1 is operating, the cooling fan 12 is rotated/driven by the engine 10. As a result, the outside air is suctioned through the suction port 15A1 of the side cover 15A on the exterior cover 15 and supplied toward the radiator 20 and the oil cooler 21 of the heat exchanger 17 so that the engine coolant and the hydraulic oil can be cooled.

At this time, the cooling air suctioned into the space 16 from the outside and going toward the heat exchanger 17 is straightly supplied toward the radiator 20 and the oil cooler 21. On the other hand, a part of the cooling air toward the vicinity of the boundary between the radiator 20 and the oil cooler 21 is guided by the air flow guide plate 26 and led to the oil cooler 21 side.

Here, since the air flow guide plate 26 has the plate body having the width dimension W1 inclined from the position in parallel with the flow direction of the cooling air to the radiator 20 side by the angle α, the cooling air supplied to the vicinity of the boundary between the radiator 20 and the oil cooler 21 is brought into contact with the air flow guide plate 26 and thus, led toward the oil cooler 21 along the inclination of the air flow guide plate 26. In this case, since the inclination angle α of the air flow guide plate 26 is set to approximately 60°, for example, and the width dimension W1 is set to approximately 20% of the length dimension L1 of the radiator 20, for example, the cooling air in an air amount required for lowering the temperature of the hydraulic oil to an appropriate temperature can be supplied to the oil cooler 21. As a result, even the small-sized oil cooler 21 having a small opening area for introducing the cooling air can supply an amount of the cooling air more than an air amount expected from the opening area toward the oil cooler 21, and the hydraulic oil can be efficiently cooled by the oil cooler 21.

Thus, according to the first embodiment, even if the oil cooler 21 cannot be formed large due to the limitation on the installation space as in the rear small revolving-type hydraulic excavator 1, the air flow guide plate 26 can lead a part of the cooling air toward the radiator 20 in the cooling air suctioned into the space 16 from the outside by the cooling fan 12 toward the oil cooler 21.

As a result, even if the radiator 20 and the oil cooler 21 are arranged in parallel with respect to the flow direction of the cooling air, a part of the cooling air can be led to the oil cooler 21, and even the small-sized oil cooler 21 can sufficiently ensure a required amount of the cooling air. Thus, even if the small oil cooler 21 is set in the small-sized hydraulic excavator 1, the hydraulic oil to be cooled can be reliably cooled by proper cooling air, and cooling capacity by the oil cooler 21 can be improved.

Since the air flow guide plate 26 is arranged at the boundary position between the radiator 20 and the oil cooler 21, the cooling air supplied toward the radiator 20 in this vicinity of the boundary can be sequentially led toward the oil cooler 21. As a result, return oil from the various actuators can be sufficiently cooled and then, the hydraulic oil can be supplied to each of the actuators again from the hydraulic pump 11. Moreover, since the air flow guide plate 26 can appropriately adjust the air amount of the cooling air which can be led toward the oil cooler 21 by changing its inclination angle α and the width dimension W1 (area), the hydraulic oil can be cooled to an appropriate temperature.

Moreover, since the air flow guide plate 26 is formed integrally by using the existing connecting bracket 22 which connects the radiator 20 and the oil cooler 21 in parallel, the air flow guide plate 26 can be mounted together with the connecting bracket 22 and can be easily provided without increasing the number of work processes.

Figure 12:
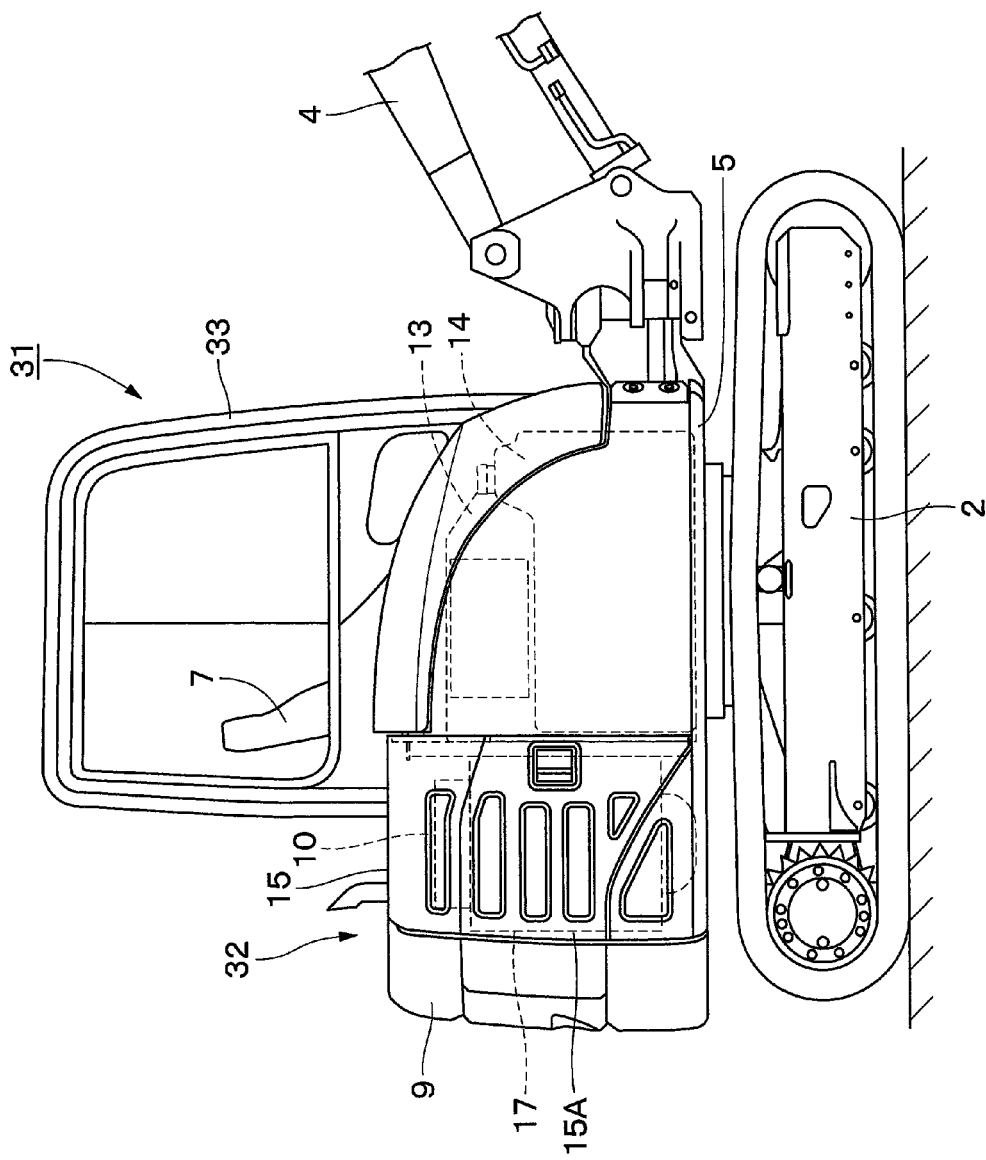
FIG. 12 is a front view showing a hydraulic excavator with a cab specification according to a second embodiment of the present invention in a state in which a working mechanism is omitted.
Figure 13:
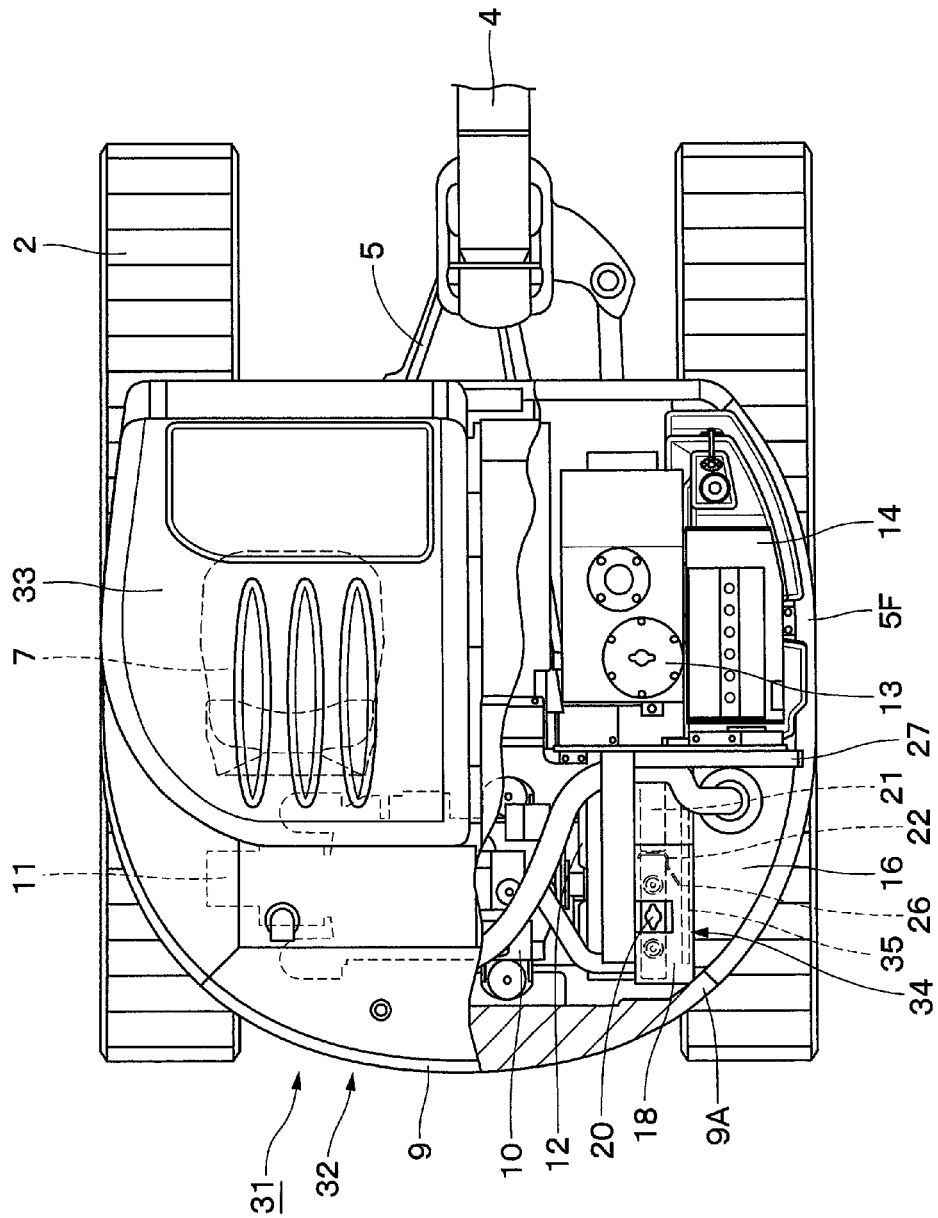
FIG. 13 is a partially broken plan view showing a state in which a floor member, a cab, an engine, a counterweight, an hydraulic oil tank, a fuel tank, a heat exchanger and the like are mounted on a revolving frame.
Figure 14:
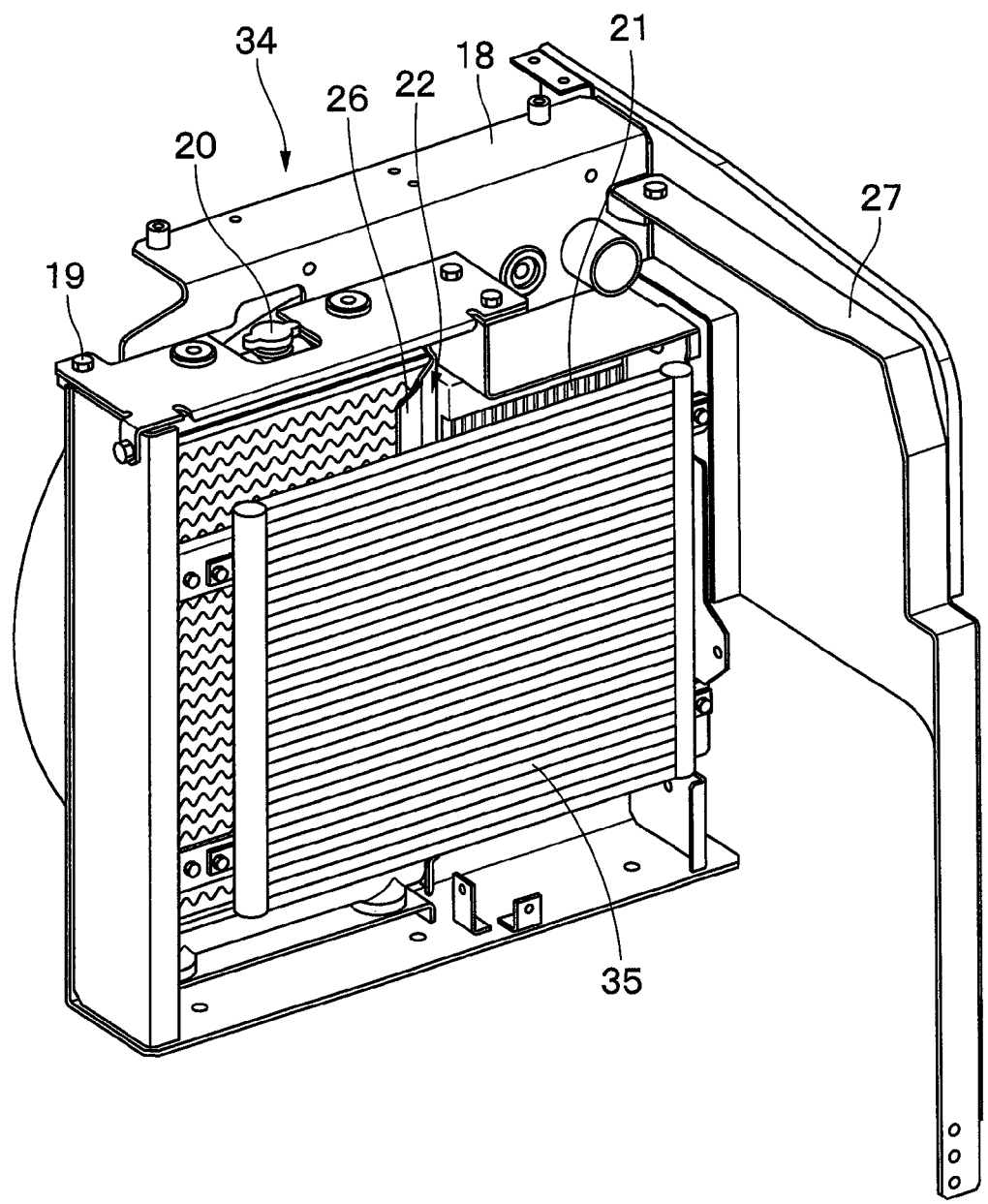
FIG. 14 is an appearance perspective view showing the heat exchanger together with a partition plate and a condenser.

Next, FIGS. 12 to 14 show a second embodiment of the present invention. A characteristic of the second embodiment is a configuration in which a condenser constituting an air conditioner is arranged overlapping the upstream sides of the radiator and the oil cooler. In the second embodiment, component elements that are identical to those in the foregoing first embodiment will be simply denoted by the same reference numerals to avoid repetitions of similar explanations.

In FIG. 12, designated at 31 is a hydraulic excavator with a cab specification as a construction machine according to the second embodiment. On an upper revolving structure 32 of this hydraulic excavator 31, a cab 33 forming an operator's room is mounted. In the cab 33, an operator's seat on which an operator is seated, various operation levers, an indoor unit of the air conditioner for conditioning an indoor environment (none of them is shown) are provided.

Designated at 34 is a heat exchanger according to the second embodiment mounted on the upper revolving structure 32 instead of the heat exchanger 17 according to the first embodiment. As shown in FIGS. 13 and 14, in this heat exchanger 34, a condenser 35 is provided at a position upstream of the radiator 20 and the oil cooler 21 in the flow direction of the cooling air. This condenser 35 is provided so as to overlap the radiator 20 and the oil cooler 21 in series with respect to the flow direction of the cooling air. The condenser 35 is to constitute a part of an outdoor unit of the air conditioner. In this case, the air flow guide plate 26 is arranged at a boundary position between the radiator 20 and the condenser 35 and can lead the cooling air having passed through the condenser 35 to the oil cooler 21 side.

Thus, in the second embodiment configured as above, too, the working effect substantially similar to the above-mentioned first embodiment can be obtained. Particularly, according to the second embodiment, even if the condenser 35 is disposed by overlapping the upstream side of the cooling air of the radiator 20 and the oil cooler 21, an appropriate amount of the cooling air can be led to the oil cooler 21 side by the air flow guide plate 26.

Figure 15:
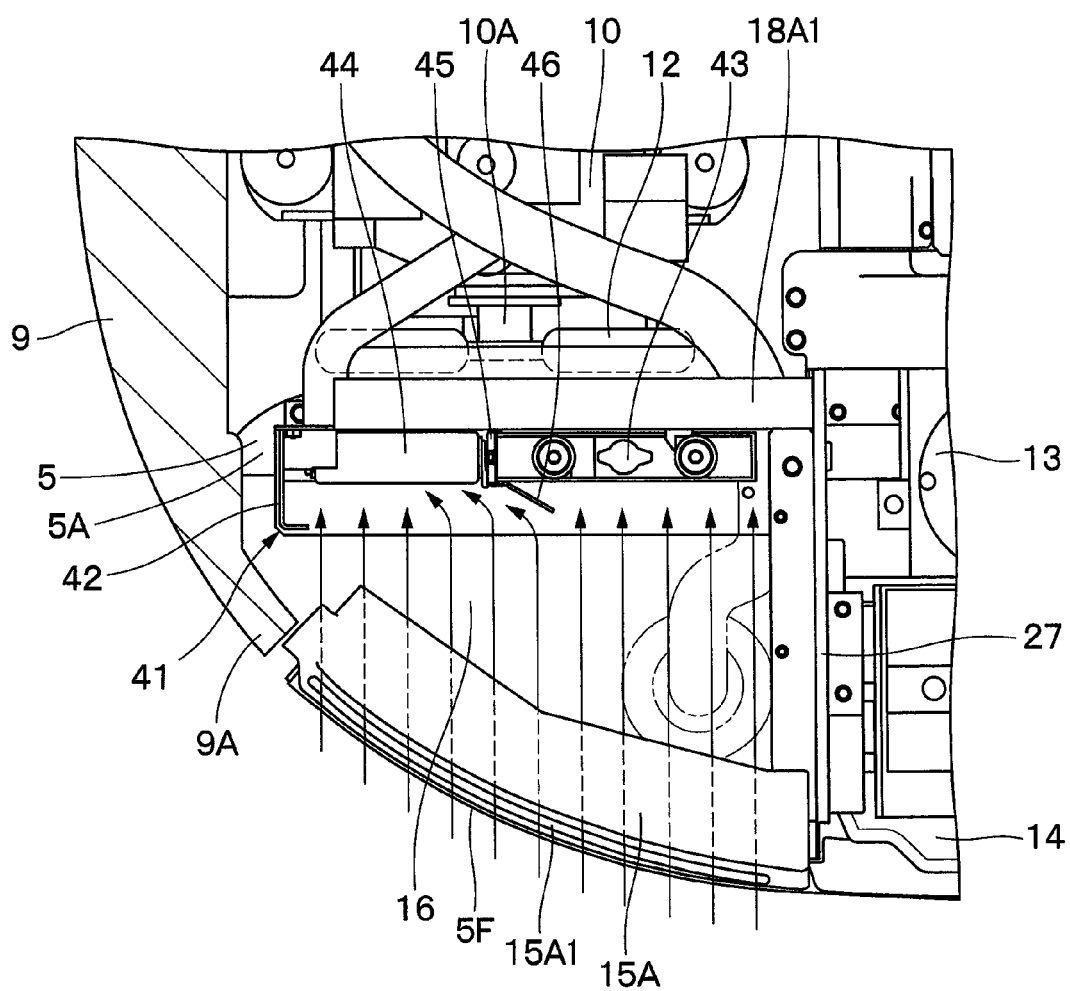
FIG. 15 is an enlarged plan view of an essential part of a heat exchanger according to a third embodiment of the present invention when seen from a position similar to that in FIG. 4.

Next, FIG. 15 shows a third embodiment of the present invention. A characteristic of the third embodiment is a configuration in which the radiator is arranged on the hydraulic oil tank side, and the oil cooler is arranged on the counterweight side. In the third embodiment, component elements that are identical to those in the foregoing first embodiment will be simply denoted by the same reference numerals to avoid repetitions of similar explanations.

In FIG. 15, designated at 41 is the heat exchanger according to the third embodiment. This heat exchanger 41 is composed of, substantially similarly to the heat exchanger 17 according to the first embodiment, a support frame 42, a radiator 43 as a first cooler, an oil cooler 44 as a second cooler, a connecting bracket 45, an air flow guide plate 46 as a cooling-air adjusting member and the like. However, in the heat exchanger 41 according to the third embodiment, the radiator 43 as the first cooler is arranged on the hydraulic oil tank 13 side (front side), and the oil cooler 44 as the second cooler is arranged on the counterweight 9 side (rear side), which is different from the heat exchanger 17 according to the first embodiment. With the heat exchanger 41 according to the third embodiment configured as above, too, an appropriate amount of the cooling air can be led to the oil cooler 44 side by the air flow guide plate 46.

Thus, in the third embodiment configured as above, too, the working effect substantially similar to the above-mentioned first embodiment can be obtained. Particularly, according to the third embodiment, even if the radiator 43 is arranged on the hydraulic oil tank 13 side (front side) and the oil cooler 44 is arranged on the counterweight 9 side (rear side), the cooling air required for cooling can be led to the oil cooler 44 side by adjusting the direction of the air flow guide plate 46. As a result, even if the small-sized oil cooler 44 is mounted, this oil cooler 44 can effectively cool the hydraulic oil.

Figure 16:
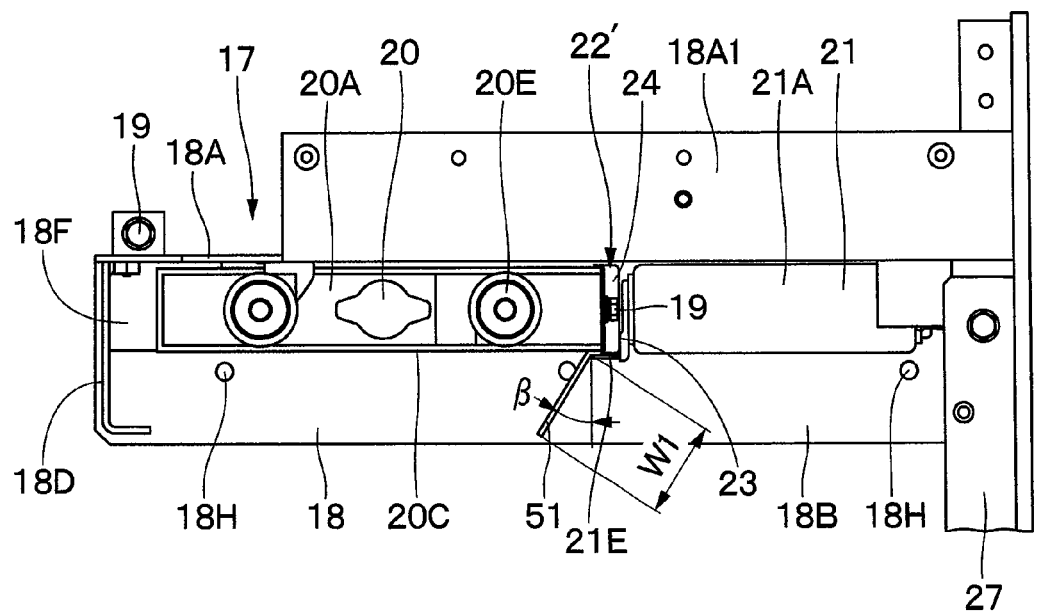
FIG. 16 is a plan view of a heat exchanger provided with an air flow guide plate according to a fourth embodiment of the present invention when seen from a position similar to that in FIG. 7.

Next, FIG. 16 shows a fourth embodiment of the present invention. A characteristic of the fourth embodiment is a configuration in which an angle of the air flow guide plate with respect to the cooling air is changed. In the fourth embodiment, component elements that are identical to those in the foregoing first embodiment will be simply denoted by the same reference numerals to avoid repetitions of similar explanations.

In FIG. 16, designated at 51 is an air flow guide plate as a cooling-air adjusting member according to the fourth embodiment provided on a connecting bracket 22'. This air flow guide plate 51 is formed as a rectangular plate body having a width dimension W1 and extending in the vertical direction substantially similarly to the air flow guide plate 26 according to the first embodiment. However, the air flow guide plate 51 according to the fourth embodiment is different from the air flow guide plate 26 according to the first embodiment in a point that the air flow guide plate 51 has an inclination angle of an angle β on the radiator 20 side from a position (0° position) parallel with the flow direction of the cooling air. The air flow guide plate 51 according to the fourth embodiment has the inclination angle β smaller than that of the air flow guide plate 26 (inclination angle α) according to the first embodiment, and the inclination angle β of the air flow guide plate 51 is changed to β=30°, for example.

Thus, in the fourth embodiment configured as above, too, the working effect substantially similar to the above-mentioned first embodiment can be obtained. Particularly, according to the fourth embodiment, by setting the air flow guide plate 51 having the inclination angle β, the air amount of the cooling air flowing along the air flow guide plate 51 can be changed, and the cooling capacity of the oil cooler 21 can be appropriately controlled.

It should be noted that in the fourth embodiment, the inclination angle β of the air flow guide plate 51 is set to an angle smaller than the inclination angle α, but it may be so configured that the inclination angle β of the air flow guide plate 51 is changed to an angle larger than the inclination angle α.

Figure 17:
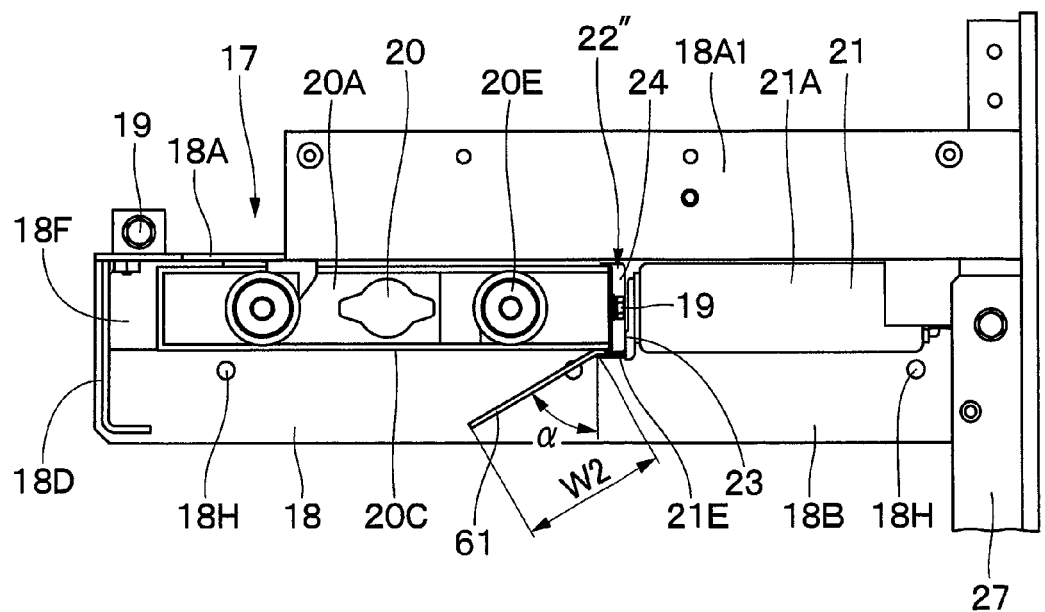
FIG. 17 is a plan view of a heat exchanger provided with an air flow guide plate according to a fifth embodiment of the present invention when seen from a position similar to that in FIG. 7.

Next, FIG. 17 shows a fifth embodiment of the present invention. A characteristic of the fifth embodiment is a configuration in which an area of the air flow guide plate faced with the cooling air is changed. In the fifth embodiment, component elements that are identical to those in the foregoing first embodiment will be simply denoted by the same reference numerals to avoid repetitions of similar explanations.

In FIG. 17, designated at 61 is an air flow guide plate as a cooling-air adjusting member according to the fifth embodiment provided on a connecting bracket 22". This air flow guide plate 61 is formed as a plate body inclined by an angle α to the radiator 20 side from a position in parallel with the flow direction of the cooling air substantially similarly to the air flow guide plate 26 according to the first embodiment. However, the air flow guide plate 61 according to the fifth embodiment is different from the air flow guide plate 26 according to the first embodiment in a point that the air flow guide plate 61 has a width dimension W2 larger than the width dimension W1 of the air flow guide plate 26 according to the first embodiment. In this fifth embodiment, the air flow guide plate 61 has the width dimension W2 larger than that of the air flow guide plate 26 (width dimension W1) according to the first embodiment, and the width dimension W2 of the air flow guide plate 61 is changed to approximately 30% of the length dimension L1 of the radiator 20, for example.

Thus, in the fifth embodiment configured as above, too, the working effect substantially similar to the above-mentioned first embodiment can be obtained. Particularly, according to the fifth embodiment, by setting the air flow guide plate 61 having the wider width dimension W2, an area faced with the cooling air can be increased and thus, many flows of the cooling air can be changed, and cooling capacity of the oil cooler 21 can be controlled.

On the other hand, in the fifth embodiment, the width dimension W2 of the air flow guide plate 61 is set to a dimension larger than the width dimension W1 of the air flow guide plate 26, but it may be so configured that the width dimension W2 of the air flow guide plate 61 is changed to a dimension smaller than the width dimension W1.

Figure 18:
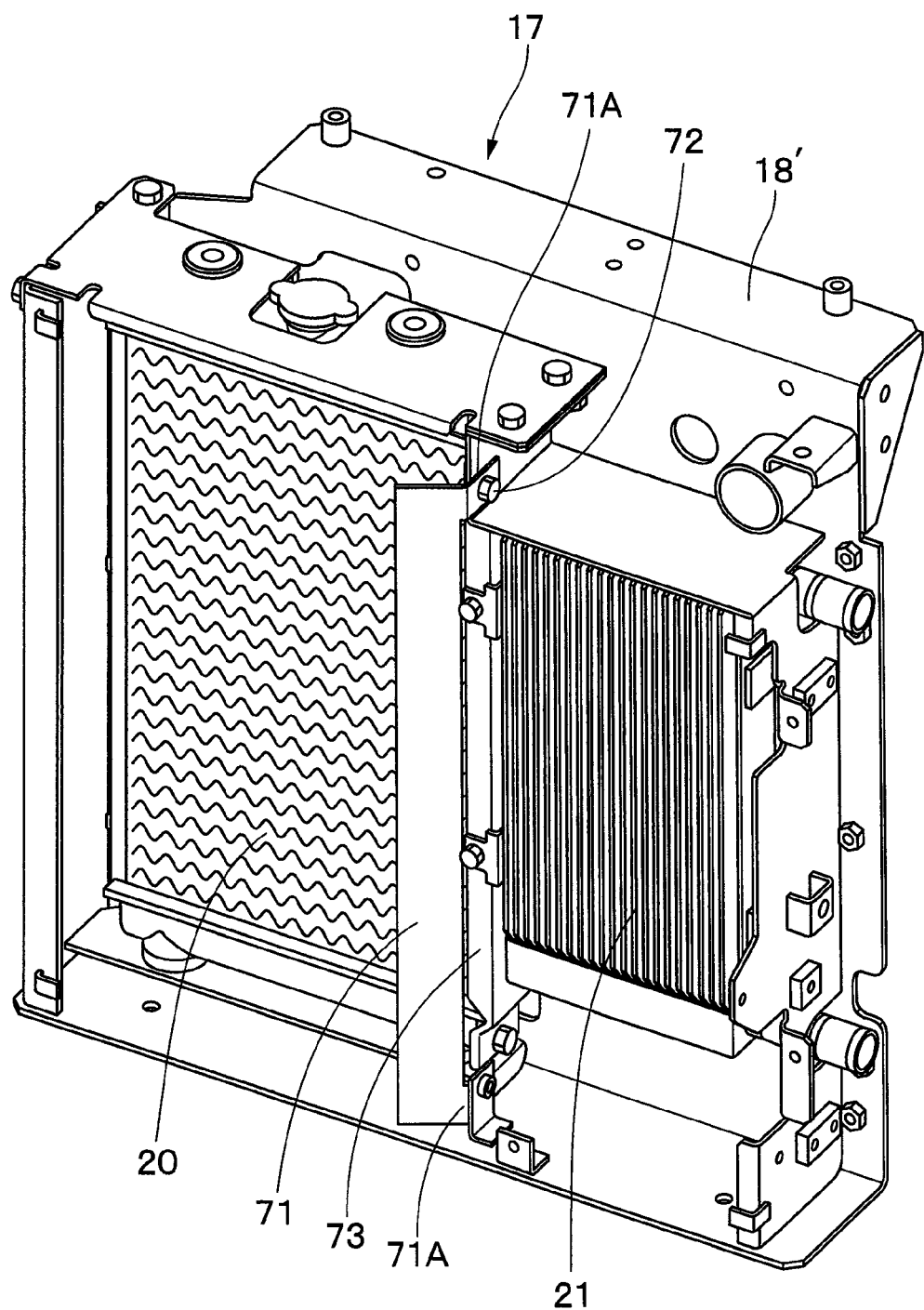
FIG. 18 is an appearance perspective view showing a heat exchanger provided with an air flow guide plate according to a first variation of the present invention from a position similar to that in FIG. 6.

It should be noted that according to the first embodiment, the example in which the air flow guide plate 26 is provided on the connecting bracket 22 is explained. However, the present invention is not limited to that and it may be configured as a first variation shown in FIG. 18, for example. That is, an air flow guide plate 71 is provided separately from a connecting bracket 73, and a mounting portion 71A is provided on an upper part and a lower part of the air flow guide plate 71, respectively. In the air flow guide plate 71, a bolt 72 inserted into each of the mounting portions 71A can be mounted on a support frame 18' of the heat exchanger 17. As a result, since the existing connecting bracket 73 can be used, the air flow guide plate 71 can be provided with fewer design changes.

Figure 19:
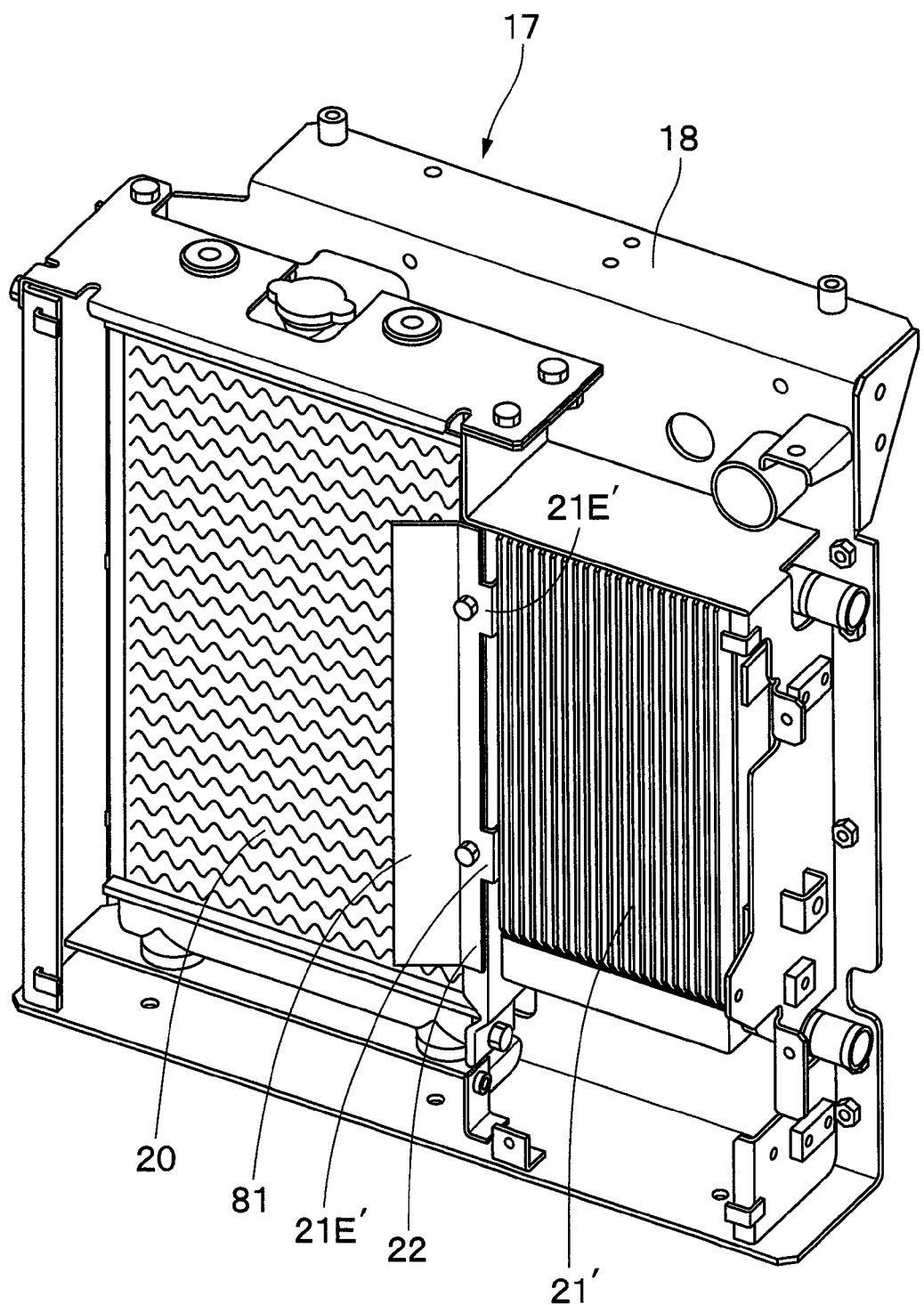
FIG. 19 is an appearance perspective view showing a heat exchanger provided with an air flow guide plate according to a second variation of the present invention from a position similar to that in FIG. 6.

On the other hand, the present invention may be configured as a second variation shown in FIG. 19. That is, an air flow guide plate 81 may be configured to be mounted to a mounting bracket 21E' of an oil cooler 21' by means such as welding, bolt tightening and the like, for example. Moreover, the air flow guide plate may be configured to be mounted on the radiator. These configurations can be applied similarly to the other embodiments.

According to the first embodiment, in a case in which the radiator 20 and the oil cooler 21 are provided as coolers, and the oil cooler 21 has a small size, the example in which the appropriate amount of the cooling air is led to the small-sized oil cooler 21 by the air flow guide plate 26 is described. However, the present invention may be configured such that, to the contrary to those described above, if the radiator 20 is small-sized and the oil cooler 21 is large-sized, a required amount of the cooling air is led toward the radiator 20 by the air flow guide plate 26. Moreover, it may be so configured that an intercoolers, a fuel coolers and the like are added as coolers, and the air flow guide plate is used also for those coolers so that the flow of the cooling air is adjusted. These configurations can be applied similarly to the other embodiments.

On the other hand, in the fourth embodiment, the example in which the inclination angle of the air flow guide plate 51 with respect to the flow direction of the cooling air is changed to the angle β, and in the fifth embodiment, the example in which the width dimension of the air flow guide plate 61 is changed to the dimension W2 are described. However, the present invention is not limited to those, and it may be so configured that both the angle and the width dimension of the air flow guide plate are changed.

According to the first embodiment, the example in which the canopy 8 is composed of the four leg part 8A and the roof part 8B as a four-column type is described. However, the present invention is not limited to that, and it may be so configured that the canopy is provided with one leg portion or two, three or five leg portions. This configuration can be applied similarly to the other embodiments.

Moreover, in each of the embodiments, the crawler type hydraulic excavator 1 is described as an example of the construction machine. However, the present invention is not limited to that, and it may be applied to a hydraulic excavator provided with a wheel type lower traveling structure, for example. Moreover, the present invention can be also widely applied to the other constructions machines such as a hydraulic crane, a wheel loader, a tractor and the like, for example.

DESCRIPTION OF REFERENCE NUMERALS 1, 31: Hydraulic excavator (Construction machine)
2: Lower traveling structure (Vehicle body)
3, 32: Upper revolving structure (Vehicle body)
4: Working mechanism
5: Revolving frame
9: Counterweight
10: Engine
11: Hydraulic pump
12: Cooling fan
13: Hydraulic oil tank (Oil tank)
14: Fuel tank (Oil tank)
16: Space
17, 34, 41: Heat exchanger
20, 43: Radiator (First cooler)
21, 44, 21': Oil cooler (Second cooler)

22, 45, 22', 22": Connecting bracket
26, 46, 51, 61, 71, 81: Air flow guide plate (Cooling-air adjusting member)
27: Partition plate
35: Condenser
L1: Length dimension of radiator
L2: Length dimension of oil cooler
α, β: Angle of air flow guide plate
W1, W2: Width dimension of air flow guide plate

The invention claimed is:

1. A construction machine comprising:
an automotive vehicle body;
an engine mounted on said automotive vehicle body and driving a hydraulic pump;
a cooling fan generating a cooling air in a suctioning direction by being rotated with said engine as a driving source;
a support frame formed as a frame structural body and mounted on said automotive vehicle body;
a first cooler arranged in said support frame and provided on an upstream side, in a flow direction of the cooling air, and faced by said cooling fan, and cooling a first fluid to be cooled by passage of the cooling air through said first cooler; and
a second cooler arranged in said support frame in parallel with said first cooler so as to be in parallel with said first cooler with respect to the flow direction of said cooling air and cooling a second fluid by the cooling air, characterized in that:
a connecting bracket connects said first cooler and said second cooler in parallel, said connecting bracket being provided between said first cooler and said second cooler;
said connecting bracket including a bracket body extending in a vertical direction between said first cooler and said second cooler and a cooling-air adjusting member located on an upstream side, in a flow direction of the cooling air flow, with respect to said first and second coolers and provided integrally with said bracket body and usable for adjusting a ratio of a first cooling air amount to be supplied to said first cooler to a second cooling air amount to be supplied to said second cooler.

2. The construction machine according to claim 1, wherein
said cooling-air adjusting member is arranged at a boundary position between said first cooler and said second cooler, extending in the vertical direction; and
said cooling-air adjusting member is arranged with an inclination to guide the cooling air in a required direction.

3. The construction machine according to claim 1, wherein
said cooling-air adjusting member is an air flow guide plate formed having a plate body extending in the vertical direction to lead the cooling air flowing toward each of said first and second coolers; and
wherein said air flow guide plate is provided capable of changing one of an angle (α) to the cooling air and an area faced by the cooling air.

4. The construction machine according to claim 1, wherein
said first cooler is a radiator for cooling an engine coolant for cooling said engine and said second cooler is an oil cooler for cooling a hydraulic oil to be supplied to various actuators; and
said cooling-air adjusting member is arranged at a boundary position between said radiator and said oil cooler to ensure a required air amount for cooling each of said radiator and said oil cooler.

5. The construction machine according to claim 4, wherein
a first length dimension, in a direction orthogonal to a flow direction of the cooling air of said radiator, is formed larger than a second length dimension, in a direction orthogonal to the flow direction of the cooling air of said oil cooler; and
said cooling-air adjusting member is arranged at an inclination to a side of said radiator side so as to ensure the cooling air required for cooling said oil cooler has a small length dimension.

6. The construction machine according to claim 1, wherein
said automotive vehicle body includes an automotive lower traveling structure and an upper revolving structure rotatably positioned on said lower traveling structure and having a working mechanism mounted on a front side thereof;
wherein said upper revolving structure has a revolving frame forming a support structural body and an arc-shaped counterweight provided on a rear side of said revolving frame to form a weight balance for said working mechanism, said engine being located on a front side of said counterweight and mounted on said revolving frame in a laterally placed position and extending in a left-right direction of said revolving frame, an oil tank located on a front side of said engine and on said revolving frame and storing a hydraulic oil and a fuel tank, located on said front side of said engine on said revolving frame and storing fuel for said construction machine; and
wherein said first cooler and said second cooler are arranged in parallel, in a front-rear direction of said automotive vehicle body, in a space formed by said counterweight, said engine, and said oil tank.

* * * * *